(12) United States Patent
Fukuoka et al.

(10) Patent No.: US 11,442,458 B2
(45) Date of Patent: Sep. 13, 2022

(54) MACHINE LEARNING SYSTEM

(71) Applicant: TOYOTA JIDOSHA KABUSHIKI KAISHA, Aichi-ken (JP)

(72) Inventors: Keisuke Fukuoka, Fujieda (JP); Shunsuke Kobuna, Shizuoka-ken (JP); Eiki Kitagawa, Odawara (JP); Daiki Yokoyama, Gotemba (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 382 days.

(21) Appl. No.: 16/729,483

(22) Filed: Dec. 30, 2019

(65) Prior Publication Data

US 2020/0233427 A1 Jul. 23, 2020

(30) Foreign Application Priority Data

Jan. 23, 2019 (JP) .............................. JP2019-009666

(51) Int. Cl.
*G05D 1/02* (2020.01)
*G06N 3/08* (2006.01)
*G06K 9/62* (2022.01)

(52) U.S. Cl.
CPC ......... *G05D 1/0221* (2013.01); *G05D 1/0219* (2013.01); *G05D 1/0223* (2013.01); *G06K 9/6256* (2013.01); *G06N 3/08* (2013.01); G05D 2201/0213 (2013.01)

(58) Field of Classification Search
CPC .. G05D 1/0221; G05D 1/0219; G05D 1/0223; G05D 2201/0213; G06K 9/6256; G06K 9/6274; G06N 3/08; G06N 3/0454; G06N 3/0481; G06N 3/084; G06N 20/00; G06V 10/82; G06V 20/56; G06V 30/194; F02D 29/02; F02D 41/06; F02D 41/1405; F02D 2200/702

See application file for complete search history.

(56) References Cited

U.S. PATENT DOCUMENTS 11,199,147 B2 * 12/2021 Aso ..................... G06N 3/0445
2020/0108815 A1 * 4/2020 Nakamura .......... F02D 41/1405
2020/0109678 A1 * 4/2020 Nakamura ........... G06N 3/0481

FOREIGN PATENT DOCUMENTS

JP         2012-112277 A     6/2012

* cited by examiner

*Primary Examiner* — Thomas Ingram
(74) *Attorney, Agent, or Firm* — Hauptman Ham, LLP

(57) ABSTRACT

A machine learning system comprises a learning planning part 81 configured to create a learning plan of a neural network model, a data set creating part 82 configured to create training data sets, a learning part 83 configured to perform learning of the neural network model using the training data sets when the vehicle is stopped, and a stopping period predicting part 84 configured to predict stopping periods of the vehicle. The data set creating part is configured to allocate the training data sets to a plurality of learning regions determined based on respective ranges of the plurality of input parameters. The learning part is configured to perform learning of the neural network model for each learning region. The learning planning part is configured to allocate the plurality of learning regions to the stopping periods so that learning of the neural network model is not suspended during the stopping periods.

6 Claims, 15 Drawing Sheets

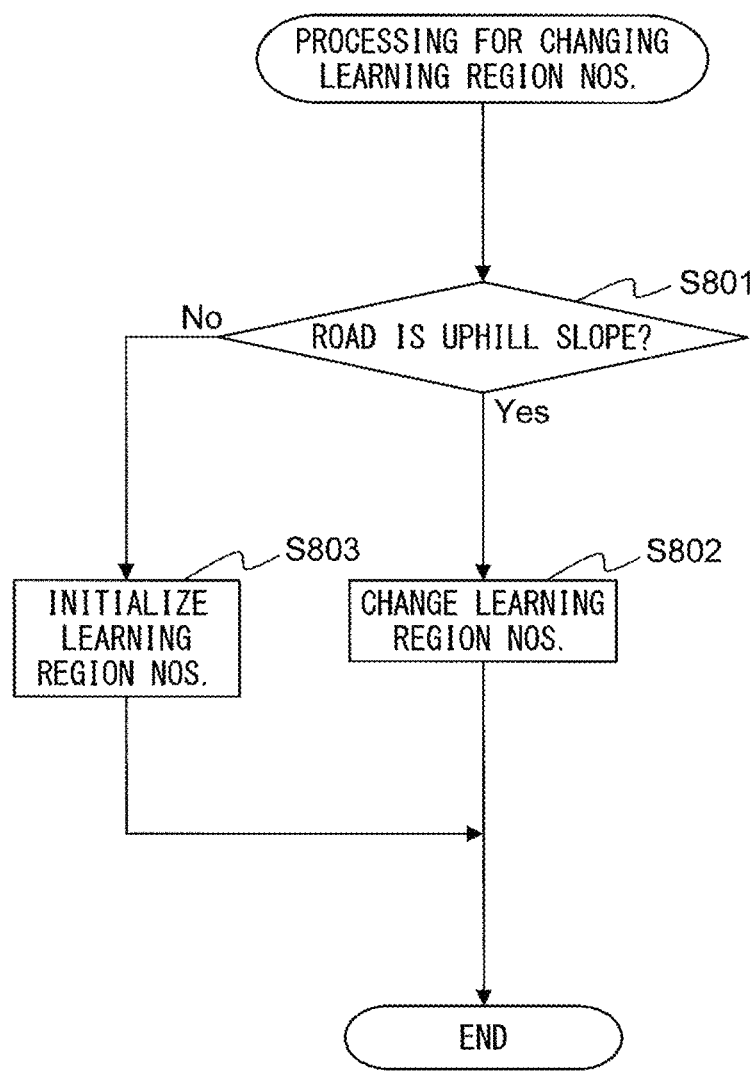

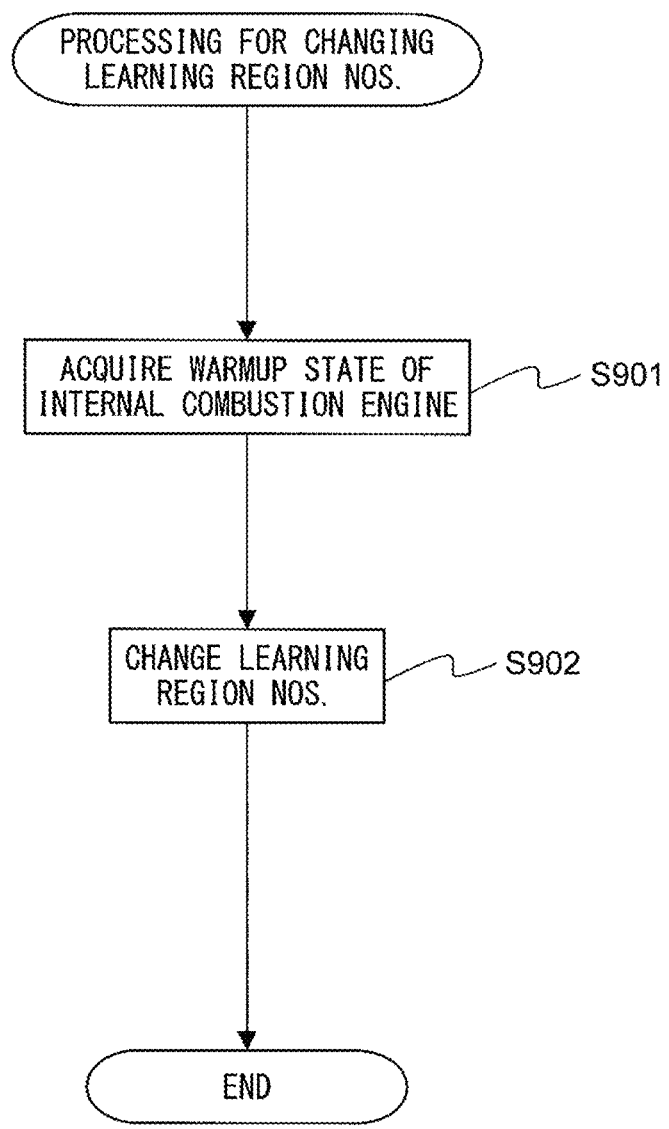

MACHINE LEARNING SYSTEM

RELATED APPLICATIONS

The present application claims priority of Japanese Patent Application No. 2019-009666, filed Jan. 23, 2019, the disclosure of which is hereby incorporated by reference herein in its entirety.

FIELD

The present invention relates to a machine learning system.

BACKGROUND

It has been known in the past to use a neural network model including an input layer, hidden layers, and an output layer to calculate a predetermined output parameter from predetermined input parameters. For example, in a control device of an internal combustion engine described in PTL 1, a learned neural network model is used to estimate an amount of flow of intake gas sucked into combustion chambers of the internal combustion engine.

CITATIONS LIST

Patent Literature

[PTL 1] Japanese Unexamined Patent Publication No. 2012-112277

SUMMARY

Technical Problem

However, if a learned neural network model is applied to a vehicle, sometimes aging etc., will cause the properties of the vehicle to change. In this case, the correspondence between the input parameters and output parameter will change and the precision of calculation of the output parameter by the neural network model will fall. Further, the properties of a vehicle differ somewhat with each vehicle.

For this reason, in order to improve the precision of calculation of the output parameter, it may be considered to acquire training data sets for learning at the vehicle and perform learning of the neural network model at the vehicle. However, the control device able to be used for learning must control the drive source (internal combustion engine, electric motor, etc.) of the vehicle while the vehicle is being driven. For this reason, learning with a high processing load is difficult to perform while the vehicle is being driven.

Therefore, it may be considered to perform learning of the neural network model while the vehicle is stopped. However, if the learning time is longer than the stopping time, it will not be possible to complete the learning during the stopping time. As a result, it will not be possible to update the neural network model by a suitable frequency and the precision of calculation of the output parameter by the neural network model will be liable to deteriorate.

Therefore, in consideration of the above problem, an object of the present invention is to provide a machine learning system able to efficiently perform learning of a neural network model in a vehicle.

Solution to Problem

The summary of the present disclosure is as follows.

(1) A machine learning system provided in a vehicle, comprising a learning planning part configured to create a learning plan of a neural network model outputting at least one output parameter from a plurality of input parameters, a data set creating part configured to acquire measured values of the plurality of input parameters and a measured value of the at least one output parameter corresponding to the measured values to create training data sets, a learning part configured to perform learning of the neural network model using the training data sets when the vehicle is stopped based on the learning plan, and a stopping period predicting part configured to predict stopping periods of the vehicle, wherein the data set creating part is configured to allocate the training data sets to a plurality of learning regions determined based on respective ranges of the plurality of input parameters, the learning part is configured to perform learning of the neural network model for each learning region, and the learning planning part is configured to allocate the plurality of learning regions to the stopping periods so that learning of the neural network model is not suspended during the stopping periods.

(2) The machine learning system described in above (1), the plurality of learning regions include a small learning region and at least one large learning region encompassing the small learning region, the small learning region and the at least one large learning region being determined so that the small learning region become higher in data density than the large learning region, and the learning planning part is configured to selectively allocate the small learning region and the at least one large learning region to the stopping periods.

(3) The machine learning system described in above (1), wherein priority orders of learning are given to the plurality of learning regions.

(4) The machine learning system described in above (3), wherein the learning planning part is configured to make the priority orders of learning of learning regions including values of the input parameters with relatively high frequencies of appearance higher than the priority orders of learning of learning regions including values of the input parameters with relatively low frequencies of appearance.

(5) The machine learning system described in above (3), wherein the learning planning part is configured to change the priority orders of learning in accordance with information on a road over which the vehicle is being driven or a warmup state of an internal combustion engine provided in the vehicle.

Advantageous Effects of Invention

According to the present invention, there is provided a machine learning system able to efficiently perform learning of a neural network model in a vehicle.

BRIEF DESCRIPTION OF DRAWINGS

FIG. 14 is a flow chart showing a control routine of processing for changing learning region nos. in a fourth embodiment of the present invention.

FIG. 15 is a flow chart showing a control routine of processing for changing learning region nos. in a fifth embodiment of the present invention.

DESCRIPTION OF EMBODIMENTS

Figure 1:
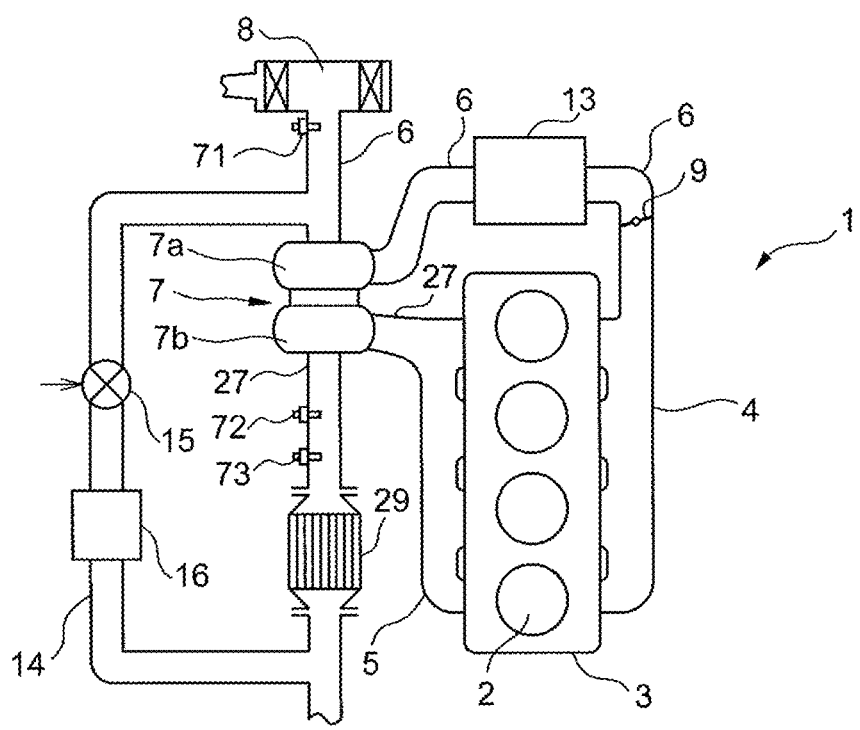
FIG. 1 is a view schematically showing an internal combustion engine to which a machine learning system according to a first embodiment is applied.

Below, referring to the drawings, embodiments of the present invention will be explained in detail. Note that, in the following explanation, similar component elements will be assigned the same reference signs.

First Embodiment

First, referring to FIGS. 1 to 10, a first embodiment of the present invention will be explained.

<Explanation of Internal Combustion Engine as Whole>

FIG. 1 is a view schematically showing an internal combustion engine to which a machine learning system according to the first embodiment is applied. The internal combustion engine 1 is a spark ignition type internal combustion engine in which spark plugs are used to ignite an air-fuel mixture (for example, a gasoline engine) and is provided in a vehicle.

The internal combustion engine 1 is provided with an engine body 3. The engine body 3 is provided with a cylinder block in which a plurality of cylinders 2 are formed, a cylinder head in which intake ports and exhaust ports are formed, and a crankcase. The cylinder head is provided with intake valves configured to open and close the intake ports, exhaust valves configured to open and close the exhaust ports, fuel injectors directly injecting fuel into the combustion chambers, and spark plugs generating sparks.

In the present embodiment, there are four cylinders 2. An intake manifold 4 and exhaust manifold 5 are connected to the cylinders 2.

The intake manifold 4 is connected through an intake pipe 6 to an outlet of a compressor 7a of a turbocharger 7. An inlet of the compressor 7a is connected through the intake pipe 6 to an air-cleaner 8. Inside the intake pipe 6, a throttle valve 9 driven by a throttle valve driving actuator is arranged. Furthermore, around the intake pipe 6, an intercooler 13 for cooling intake air flowing through the inside of the intake pipe 6 is arranged. Note that, the intercooler 13 may be housed in the intake manifold 4. The intake manifold 4 and the intake pipe 6 form an intake passage guiding air to the insides of the cylinders 2.

On the other hand, the exhaust manifold 5 is connected through an exhaust pipe 27 to an inlet of a turbine 7b of the turbocharger 7. An outlet of the turbine 7b is connected through the exhaust pipe 27 to a catalyst 29. The catalyst 29, for example, is a three-way catalyst removing HC, CO, NOx, etc., in the exhaust gas. The exhaust manifold 5 and exhaust pipe 27 form an exhaust passage discharging, from the cylinders 2, exhaust gas generated by combustion of the air-fuel mixture.

The exhaust passage and the intake passage are connected with each other through an exhaust gas recirculation passage (EGR passage) 14. The EGR passage 14 makes a part of the exhaust gas flowing through the exhaust passage recirculate as EGR gas to the intake passage. Further, the EGR passage 14 is provided with an electronic control type EGR control valve 15. The EGR control valve 15 adjusts the amount of EGR gas recirculated from the exhaust passage to the intake passage. Furthermore, the EGR passage 14 is provided with an EGR cooler 16 for cooling the EGR gas.

In the present embodiment, the EGR passage 14 is connected with the exhaust passage at the downstream side from the catalyst 29 and with the intake passage at the upstream side from the compressor 7a. Therefore, the internal combustion engine 1 is provided with a so-called low pressure loop type (LPL type) EGR system. Note that, the internal combustion engine 1 may be provided with another type of EGR system. For example, the internal combustion engine 1 may be provided with a so-called high pressure loop type (HPL type) EGR system. In this case, the EGR passage is, for example, connected to the exhaust manifold 5 and intake manifold 4.

Note that, the configuration of the internal combustion engine is not limited to the above-mentioned configuration. Therefore, the specific configuration of the internal combustion engine such as the cylinder array, injection mode of fuel, configuration of the intake/exhaust system, configuration of the valve operating mechanism, configuration of the supercharger, and the presence of supercharger may be different from the configuration shown in FIG. 1. For example, the fuel injectors may be arranged so as to inject fuel to the insides of the intake ports.

<Configuration of ECU>

Figure 2:
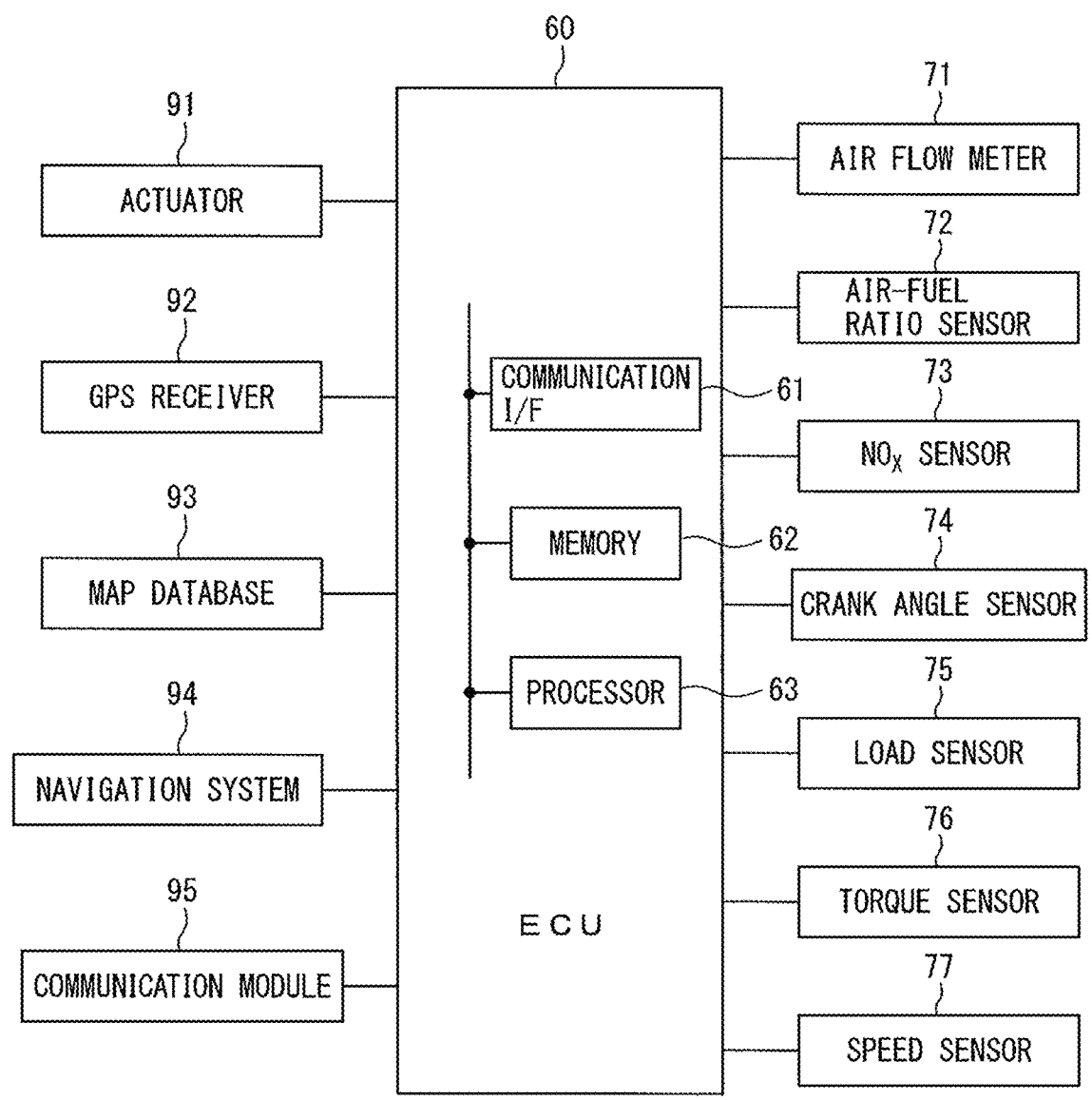
FIG. 2 is a view schematically showing a configuration of an ECU.

The vehicle mounting the internal combustion engine 1 is provided with an electronic control unit (ECU). FIG. 2 is a view schematically showing the configuration of the ECU. The ECU 60 includes a communication interface 61, memory 62, and processor 63 and performs various control routines of the vehicle. For example, the internal combustion engine 1 is controlled in various ways by the ECU 60 based on the outputs of various sensors. Note that, in the present embodiment, a single ECU 60 is provided, but a plurality of ECUs may be provided for the individual functions.

The communication interface 61 has an interface circuit for connecting the ECU 60 to a vehicle internal network based on the CAN (Controller Area Network) or other standard. The ECU 60 communicates through the communication interface 61 with other vehicle-mounted devices.

The memory 62, for example, has a volatile semiconductor memory (for example, RAM) and nonvolatile semiconductor memory (for example, ROM). The memory 62 stores programs to be run at the processor 63, various data used when various processing is performed by the processor 63, etc.

The processor 63 has one or more CPUs (central processing unit) and their peripheral circuits and performs various types of processing. Note that, the processor 63 may further have processing circuits such as logic processing units or numeric processing units. The communication interface 61, memory 62, and processor 63 are connected with each other through signal wires.

The ECU 60 is connected through the vehicle internal network to an actuator 91 and controls the actuator 91. In the present embodiment, the actuator 91 includes fuel injectors, spark plugs, a throttle valve drive actuator, EGR control valve 15, etc.

Further, the vehicle is provided with a GPS receiver 92. The GPS receiver 92 receives signals from three or more GPS satellites and detects a current position of the vehicle (for example, the latitude and longitude of the vehicle). The GPS receiver 92 is connected through the vehicle internal network to the ECU 60. The output of the GPS receiver 92 is sent to the ECU 60.

Further, the vehicle is provided with a map database 93. The map database 93 stores map information. The map information includes position information of the roads, shape information of the roads (for example, curved or straight, radii of curvature of curves, road gradients, etc.), types of roads, speed limits, and other road information. The map database 93 is connected through the vehicle internal network to the ECU 60. The ECU 60 acquires map information from the map database 93.

Further, the vehicle is provided with a navigation system 94. The navigation system 94 sets a driving route of the vehicle up to a destination based on the current position of the vehicle detected by the GPS receiver 92, the map information of the map database 93, input by the driver of the vehicle, etc. The navigation system 94 is connected through the vehicle internal network to the ECU 60. The driving route set by the navigation system 94 is sent to the ECU 60. Note that, the GPS receiver 92 and map database 93 may be built into the navigation system 94.

Further, the vehicle is provided with a communication module 95. The communication module 95 is a device enabling communication between the vehicle and outside of the vehicle. The communication module 95, for example, includes a data communication module (DCM), short range wireless communication module, etc. The vehicle communicates with servers etc., outside of the vehicle via the data communication module. Further, the vehicle communicates with roadside apparatuses by road-vehicle communications through the short range wireless module and communicates with vehicles by vehicle-vehicle communication. The information received by the communication module 95 is sent to the ECU 60.

Further, the ECU 60 receives as input the outputs of an air flow meter 71, air-fuel ratio sensor 72, NOx sensor 73, crank angle sensor 74, load sensor 75, torque sensor 76, and speed sensor 77.

The air flow meter 71 detects the amount of flow of air inside the intake passage. As shown in FIG. 1, the air flow meter 71 is arranged in the intake pipe 6 between the air cleaner 8 and the compressor 7a. The air flow meter 71 is electrically connected to the ECU 60. The output of the air flow meter 71 is sent to the ECU 60.

The air-fuel ratio sensor 72 detects the air-fuel ratio of the exhaust gas. As shown in FIG. 1, the air-fuel ratio sensor 72 is arranged in the exhaust pipe 27 between the turbine 7b and the catalyst 29. The air-fuel ratio sensor 72 is electrically connected to the ECU 60. The output of the air-fuel ratio sensor 72 is sent to the ECU 60.

The NOx sensor 73 detects the concentration of nitrogen oxides (NOx) in the exhaust gas. As shown in FIG. 1, the NOx sensor 73 is arranged in the exhaust pipe 27 between the turbine 7b and the catalyst 29. The NOx sensor 73 is electrically connected to the ECU 60. The output of the NOx sensor 73 is sent to the ECU 60.

The crank angle sensor 74 generates an output pulse each time the crankshaft of the internal combustion engine 1 rotates by a predetermined angle (for example, 10 degrees). The crank angle sensor 74 is electrically connected to the ECU 60. The output of the crank angle sensor 74 is sent to the ECU 60. The ECU 60 calculates the engine speed based on the output of the crank angle sensor 74.

The load sensor 75 is connected to an accelerator pedal provided at the vehicle and detects the amount of depression of the accelerator pedal. The load sensor 75 is electrically connected to the ECU 60. The output of the load sensor 75 is sent to the ECU 60. The ECU 60 calculates the engine load based on the output of the load sensor 75.

The torque sensor 76 is, for example, arranged at the crankshaft of the internal combustion engine 1 and detects the output torque of the internal combustion engine 1. The torque sensor 76 is electrically connected to the ECU 60. The output of the torque sensor 76 is sent to the ECU 60.

The speed sensor 77 is provided at the vehicle and detects the speed of the vehicle. The speed sensor 77 is electrically connected to the ECU 60. The output of the speed sensor 77 is sent to the ECU 60.

Further, in the present embodiment, the ECU 60 functions as a machine learning system provided at a vehicle so as to perform learning of a neural network model.

<Summary of Neural Network Model>

Figure 3:
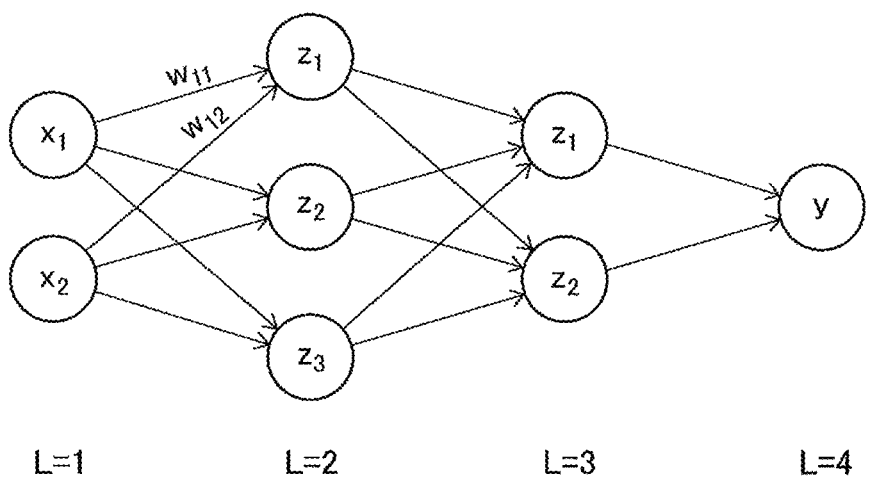
FIG. 3 shows one example of a neural network having a simple configuration.

First, referring to FIG. 3, an outline of a neural network model will be explained. FIG. 3 shows one example of a neural network model having a simple configuration.

The circle marks in FIG. 3 show manmade neurons. The manmade neurons are usually called "nodes" or "units" (in the Description, given as "nodes"). In FIG. 3, L=1 shows the input layer, L=2 and L=3 show hidden layers, and L=4 shows the output layer. Note that, the hidden layers are also called "intermediate layers".

In FIG. 3, $x_1$ and $x_2$ show the nodes of the input layer (L=1) and the output values from those nodes, while "y" shows the node of the output layer (L=4) and the output value of the same. Similarly, $z_1^{(L=2)}$, $z_2^{(L=2)}$, and $z_3^{(L=2)}$ show the nodes of the hidden layer (L=2) and the output values from those nodes, while $z_1^{(L=3)}$ and $z_2^{(L=3)}$ show the nodes of the hidden layer (L=3) and the output values from those nodes.

At the nodes of the input layer, the inputs are output as they are. On the other hand, at the nodes of the hidden layer (L=2), the output values $x_1$ and $x_2$ of the nodes of the input layer are input, while at the nodes of the hidden layer (L=2), the respectively corresponding weights "w" and biases "b" are used to calculate the sum input values "u". For example, in FIG. 3, the sum input value $u_k^{(L=2)}$ calculated at a node shown by $z_k^{(L=2)}$(k=1, 2, 3) in the hidden layer (L=2) becomes as in the following equation (M is the number of nodes of the input layer).

[Equation 1]

$$u_k^{(L=2)} = \sum_{m=1}^{M}\left(x_m \cdot w_{km}^{(L=2)}\right) + b_k$$

Next, this sum input value $u_k^{(L=2)}$ is converted by an activation function "f" and is output from a node shown by $z_k^{(L=2)}$ of the hidden layer (L=2) as an output value $z_k^{(L=2)}$ (=f($u_k^{(L=2)}$)). On the other hand, at the nodes of the hidden layer (L=3), the output values $z_1^{(L=2)}$, $z_2^{(L=2)}$, and $z_3^{(L=2)}$ of the nodes of the hidden layer (L=2) are input. At the nodes of the hidden layer (L=3), the respectively corresponding weights "w" and biases "b" are used to calculate the sum input values "u" (=Σz·w+b). The sum input values "u" are similarly converted by an activation function and output from the nodes of the hidden layer (L=3) as the output values $z_1^{(L=3)}$ and $z_2^{(L=3)}$. This activation function is for example a Sigmoid function σ.

Further, at the node of the output layer (L=4), the output values $z_1^{(L=3)}$ and $z_2^{(L=3)}$ of the nodes of the hidden layer (L=3) are input. At the node of the output layer, the respectively corresponding weight "w" and bias "b" are used to calculate the sum input value "u" (=Σz·w+b) or only the respectively corresponding weight "w" is used to calculate the sum input value "u" (Σz·w). For example, at the node of the output layer, as an activation function, an identity function is used. In this case, the sum input value "u" calculated at the node of the output layer is output as is as the output value "y" from the node of the output layer.

<Learning in Neural Network Model>

In the present embodiment, the error backpropagation algorithm is used to learn the values of the weights "w" and biases "b" in the neural network model. This error backpropagation algorithm is known. Therefore, the error backpropagation algorithm will be explained simply below in its outlines. Note that, a bias "b" is one kind of weight "w", therefore in the following explanation, a bias "b" is deemed one type of weight "w".

In the neural network model such as shown in FIG. 3, if the weights at the sum input values $u^{(L)}$ to the nodes of the layers of L=2, L=3, or L=4 are expressed by $w^{(L)}$, the differential due to the weights $w^{(L)}$ of the error function E, that is, the gradient $\partial E/\partial w^{(L)}$, can be rewritten as shown in the following equation:

[Equation 2]

$$\partial E/\partial w^{(L)} = (\partial E/\partial u^{(L)})(\partial u^{(L)}/\partial w^{(L)}) \quad (1)$$

where, $z^{(L-1)} \cdot \partial w^{(L)} = \partial u^{(L)}$, and if $(\partial E/\partial u^{(L)}) = \delta^{(L)}$, the above equation (1) can be converted as shown by the following equation:

[Equation 3]

$$\partial E/\partial w^{(L)} = \delta^{(L)} \cdot z^{(L-1)} \quad (2)$$

Here, if $u^{(L)}$ fluctuates, fluctuation of the error function E is caused through the change in the sum input values $u^{(L+1)}$ of the following layer, therefore $\delta^{(L)}$ can be expressed by the following equation (K is the number of nodes at the L+1 layer):

[Equation 4]

$$\delta^{(L)} = \left(\frac{\partial E}{\partial u^{(L)}}\right) = \sum_{k=1}^{K}\left(\frac{\partial E}{\partial u_k^{(L+1)}}\right)\left(\frac{\partial u_k^{(L+1)}}{\partial u^{(L)}}\right) (k=1,2,\ldots,K) \quad (3)$$

where, if $z^{(L)} = f(u^{(L)})$, the sum input value $u_k^{(L+1)}$ at the right side of the above equation (3) is expressed by the following equation:

[Equation 5]

$$u_k^{(L+1)} = \sum_{k=1}^{K} w_k^{(L+1)} \cdot z^{(L)}$$

$$= \sum_{k=1}^{K} w_k^{(L+1)} \cdot f(u^{(L)}) \quad (4)$$

where, the first term $(\partial E/\partial u^{(L+1)})$ at the right side of the above equation (3) is $\delta^{(L+1)}$. Further, the second term $(\partial u_k^{(L+1)}/\partial u^{(L)})$ at the right side of the above equation (3) is expressed by the following equation:

[Equation 6]

$$\partial(w_k^{(L+1)} \cdot z^{(L)})/\partial u^{(L)} = w_k^{(L+1)} \cdot \partial f(u^{(L)})/\partial u^{(L)} = w_k^{(L+1)} \cdot f'(u^{(L)}) \quad (5)$$

Therefore, $\delta^{(L)}$ is expressed by the following equation:

[Equation 7]

$$\delta^{(L)} = \sum_{k=1}^{K} w_k^{(L+1)} \cdot \delta^{(L+1)} \cdot f'(u^{(L)})$$

That is $$\delta^{(L-1)} = \sum_{k=1}^{K} w_k^{(L)} \cdot \delta^{(L)} \cdot f'(u^{(L-1)}) \quad (6)$$

Accordingly, if $\delta^{(L+1)}$ is found, $\delta^{(L)}$ can be found.

When performing learning of the neural network model, a training data set including a certain input value "x" and true data $y_t$ of the output value for that input value "x" is used. When the output value from the output layer corresponding to a certain input value "x" is "y", if the square error is used as the error function, the error function E becomes $E = \frac{1}{2}(y-y_t)^2$. Further, at the node of the output layer (L=4) of FIG. 3, the output value "y" becomes $f(u^{(L)})$. For this reason, the value of $\delta^{(L)}$ at the node of the output layer (L=4) is expressed by the following equation:

[Equation 8]

$$\delta^{(L)} = \partial E/\partial u^{(L)} = (\partial E/\partial y)(\partial y/\partial u^{(L)}) = (y-y_t) \cdot f'(u^{(L)}) \quad (7)$$

Here, if the activation function $f(u^{(L)})$ of the output layer is an identity function, $f'(u^{(L)}) = 1$. Therefore, $\delta^{(L)} = y - y_t$ and $\delta^{(L)}$ is found.

If $\delta^{(L)}$ is found, the above equation (6) is used to find the $\delta^{(L-1)}$ of the previous layer. The δ of the previous layer is successively found in this way. Using these values of δ, from the above equation (2), the differential of the error function E, that is, the gradient $\partial E/\partial w^{(L)}$, is found for the weights "w". If the gradient $\partial E/\partial w^{(L)}$ is found, this gradient $\partial E/\partial w^{(L)}$ is used to update the values of the weights "w" so that the value of the error function E decreases. That is, the weights "w" are learned.

<Learning of Neural Network Model in Vehicle>

In the present embodiment, a neural network model such as shown in FIG. 3 is mounted in the vehicle (specifically, the ECU 60). Further, in the present embodiment, the neural network model covers the internal combustion engine 1. For this reason, the neural network model outputs at least one output parameter of the internal combustion engine 1 from a plurality of input parameters of the internal combustion engine 1.

The learning of the neural network model (that is, the setting of the weights "w" and biases "b") is performed before shipment of the vehicle. In learning of the neural network model, a training data set including combinations of measured values of the input parameters and a measured value of the output parameter corresponding to the measured values of the input parameters is used. Specifically, a large number of training data sets are used to repeatedly update the values of the weights "w" and biases "b" in the neural network model by the above-mentioned error backpropagation algorithm. As a result, the neural network model is learned and a learned neural network model is created.

However, the large number of training data sets are acquired in advance using an internal combustion engine for creating training data by an engine bench etc. rather than using the actual internal combustion engine 1 provided in a vehicle in which a neural network model is mounted. Further, the properties of the internal combustion engine 1 sometimes differ somewhat from the properties of the internal combustion engine for creating training data. For this reason, the learned neural network model is liable to not accurately conform to the properties of the internal combustion engine 1. Further, due to aging etc., sometimes the properties of the internal combustion engine 1 change.

For this reason, in the present embodiment, in order to improve the precision of an output parameter calculated by the neural network model, the ECU 60 is used for performing learning of the neural network model at the vehicle as well. By doing this, the neural network model accurately conforms to the properties of the internal combustion engine 1 and the precision of the output parameter calculated by the neural network model is improved.

Figure 4:
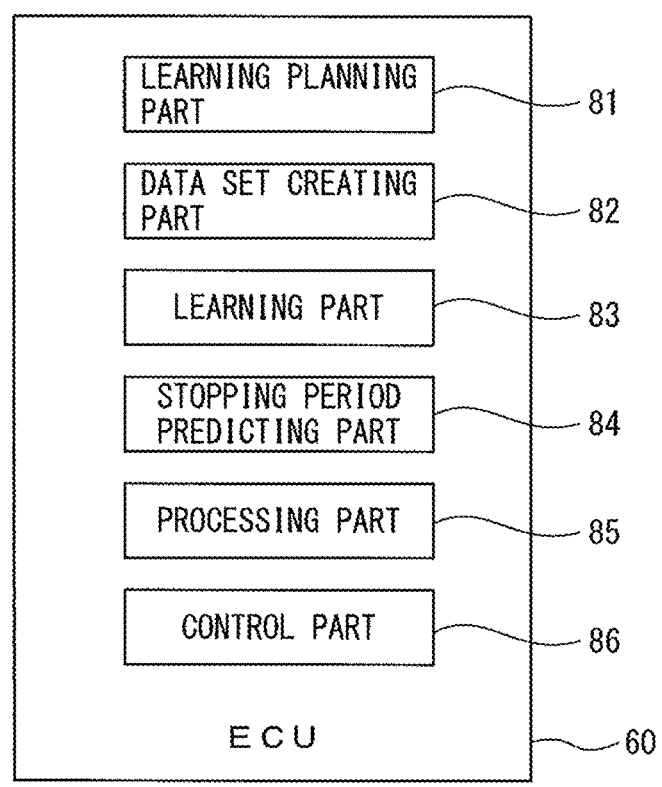
FIG. 4 is a functional block diagram of the ECU.

FIG. 4 is a functional block diagram of the ECU 60. In the present embodiment, the ECU 60 has a learning planning part 81, data set creating part 82, learning part 83, stopping period predicting part 84, processing part 85, and control part 86. These are functional blocks realized by a program stored in the memory 62 of the ECU 60 being run by the processor 63 of the ECU 60.

The learning planning part 81 creates a learning plan of the neural network model outputting at least one output parameter from a plurality of input parameters. The data set creating part 82 acquires measured values of a plurality of the input parameters and measured values of the output parameters corresponding to these measured values to create training data sets. The training data sets includes combinations of measured values of the plurality of the input parameters and the measured values of the output parameters corresponding to these measured values. The learning part 83 performs learning of the neural network model using the training data sets acquired at the vehicle by the data set creating part 82 based on the learning plan created by the learning planning part 81.

The neural network model is stored in the memory 62 of the ECU 60. The neural network model, for example, has the configuration shown in FIG. 3. Note that, the number of layers of the neural network model may be any number equal to or greater than 3. Further, the number of nodes of the input layer may be any number equal to or greater than 2. Further, the numbers of nodes of the hidden layers and output layer may respectively be any numbers equal to or greater than 1.

The stopping period predicting part 84 predicts the stopping periods of the vehicle (below, simply referred to as the "stopping periods"). Specifically, the stopping period predicting part 84 predicts the dates and times when stopping periods will occur (stopping dates and times) and the lengths of time of the stopping periods (stopping times). Note that, "stopping of the vehicle" means a state of zero vehicle speed. For this reason, "stopping of the vehicle" includes a state where the vehicle temporarily stops in front of a traffic light, a state where congestion causes the vehicle to temporarily stop, a state where the vehicle is parked at the home or other parking space, etc.

If the vehicle is used for commuting to work, commuting to school, shopping, or other applications, the time frames in which the vehicle is used will often be substantially constant. For this reason, the stopping period predicting part 84, for example, predicts the stopping periods based on the information of the driving history of the vehicle. In this case, information of the driving history of the vehicle in a predetermined period in the past is, for example, stored in the memory 62 of the ECU 60. Note that, information of the driving history of the vehicle may be stored in another storage device provided in the vehicle.

The information of the driving history includes dates, days, time frames, weather, positions of the vehicle, presence of any driving of the vehicle, etc. Further, if a driver monitor camera capturing the driver of the vehicle to generate an image is provided in the vehicle, driver information may be included in the information of the driving history of the vehicle. In this case, it is possible to identify the driver of the vehicle by the driver monitor camera so as to predict the stopping periods and thereby improve the precision of prediction of the stopping periods even if the vehicle is used by several persons.

Further, the stopping period predicting part 84 may predict the stopping periods based on the current position of the vehicle detected by the GPS receiver 92, the driving route of the vehicle set by the navigation system 94, etc. Further, the stopping period predicting part 84 may predict the stopping periods based on information received by the communication module 95 from the servers, roadside apparatuses, or other vehicles (traffic light information, congestion information, weather information, etc.). Further, the stopping period predicting part 84 may combine the above prediction methods to predict the stopping periods.

Figure 5:
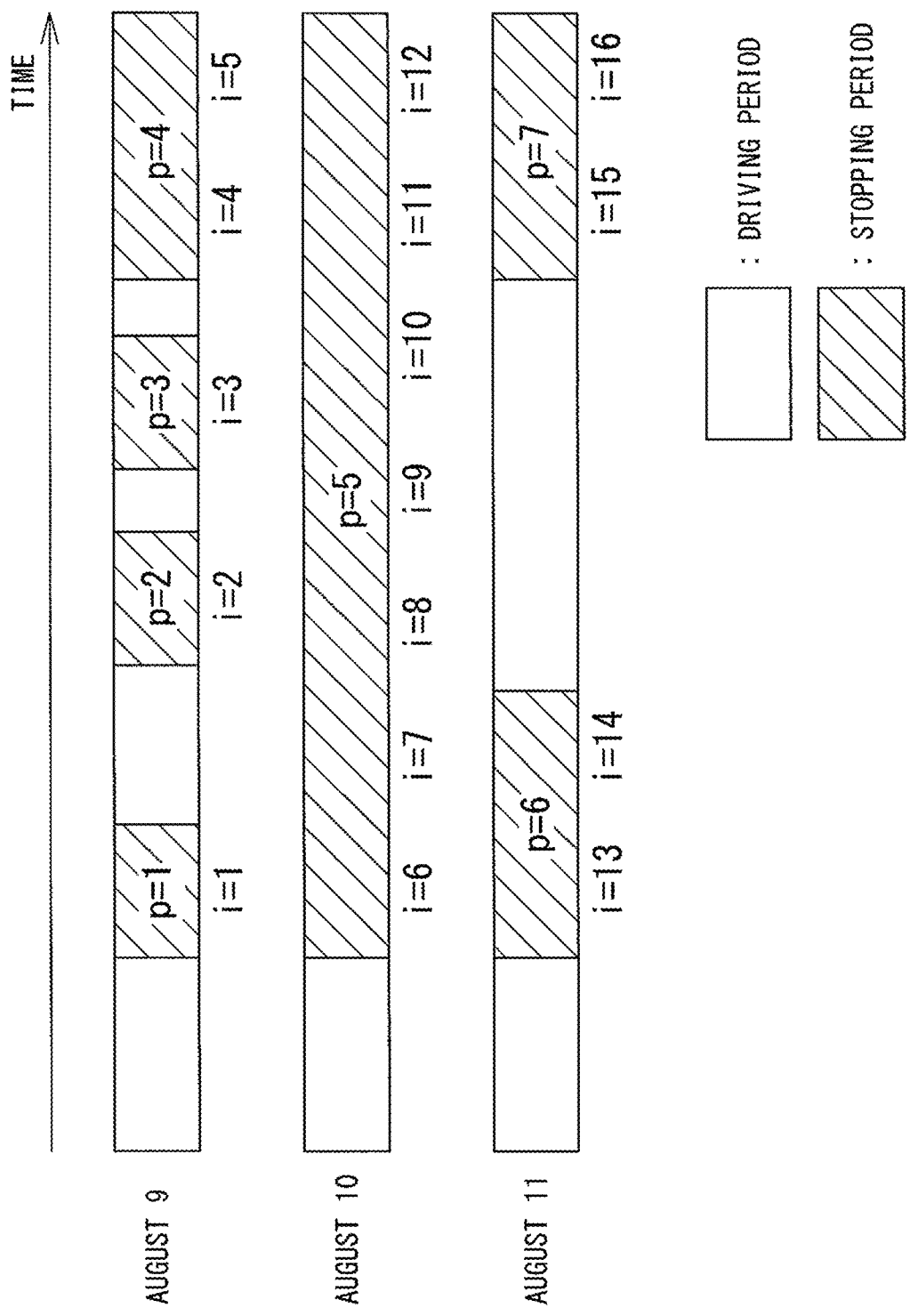
FIG. 5 is a view showing one example of results of prediction of stopping times.

The stopping period predicting part 84 predicts the stopping periods in a predetermined period in the future. FIG. 5 is a view showing one example of the results of prediction of the stopping periods. In this example, the stopping period predicting part 84 predicts the stopping periods of the vehicle in a period of three days in the future (August 9 to August 11). FIG. 5 shows the driving periods when the vehicle is predicted to be driven and the stopping periods (hatched parts) when the vehicle is predicted to be stopped. The widths of the driving periods show the lengths of time of the driving periods, while the widths of the stopping periods show the lengths of time of the stopping periods. Stopping period nos. (p=1 to 7) are respectively given to successive stopping periods.

In this regard, the ECU 60 also functions as a control device of the internal combustion engine 1. For this reason, when the vehicle is being driven, the ECU 60 controls the internal combustion engine 1 so as to obtain the drive power for driving. For this reason, the processing resources of the ECU 60 which can be used for learning of the neural network model are limited. However, in learning of a neural network model, considerable processing has to be performed for updating the weights "w" and biases "b". For this reason, it is difficult to perform learning with a high processing load while the vehicle is being driven. Further, increasing the processing ability of the ECU 60 for performing learning while the vehicle is being driven or providing an additional ECU for learning would increase the cost of the vehicle.

Therefore, in the present embodiment, the learning part 83 performs learning of the neural network model when the vehicle is stopped. By doing this, it is possible to perform learning of the neural network model when the processing resources of the ECU 60 are available.

However, if the learning time of the neural network model is longer than the stopping period, it is not possible to complete the learning within the stopping period. As a result, it is not possible to update the neural network model by a suitable frequency and the precision of calculation of an output parameter by the neural network model is liable to deteriorate.

The greater the number of training data sets used for learning, the longer the learning time of the neural network model. For this reason, in order to shorten the learning time, it is necessary to reduce the number of training data sets used in one learning operation.

The plurality of input parameters of a neural network model respectively have predetermined ranges. Each predetermined range, for example, is set to a range between an upper limit value and a lower limit value of a value which can appear in the internal combustion engine 1. If using the training data sets in all of the ranges of the input parameters for learning, a tremendous amount of time would become required for learning and the learning will not be able to be completed within the stopping period.

Therefore, in the present embodiment, the created training data sets are allocated to the plurality of learning regions, and in each learning region, the training data sets in the learning region are used for learning of the neural network model. By doing this, it is possible to decrease the learning time per one learning and in turn possible to raise the frequency of updating the neural network model. Therefore, in the vehicle, it is possible to efficiently perform the learning of the neural network model.

Figure 6:
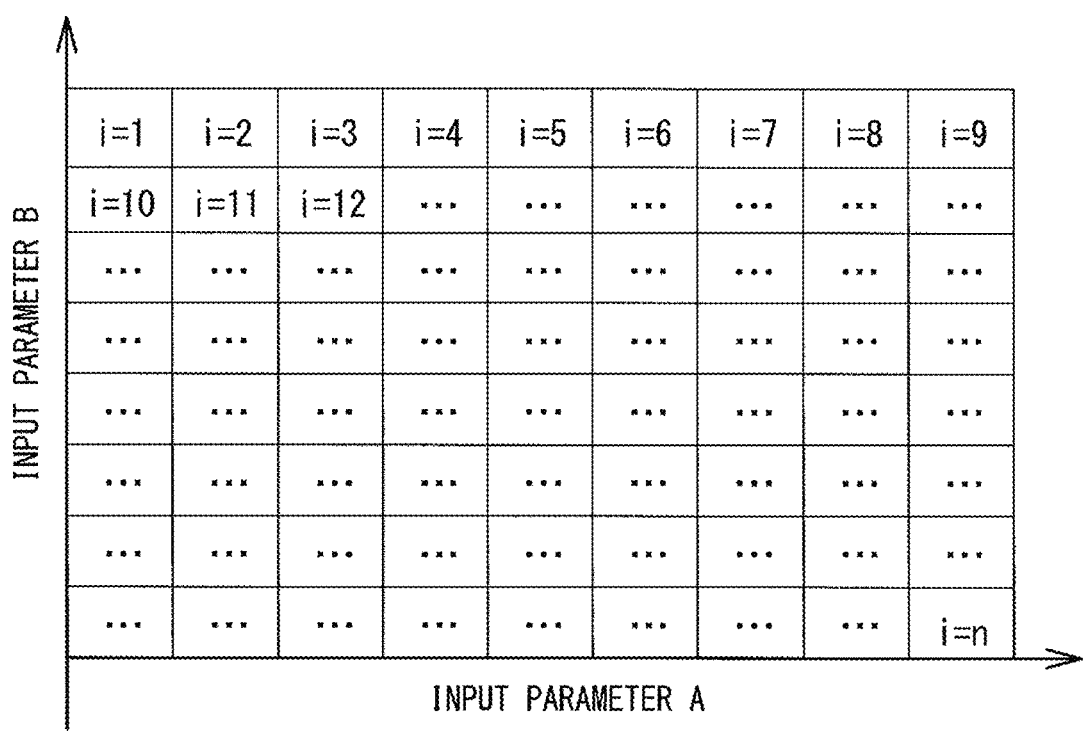
FIG. 6 is a view schematically showing a plurality of learning regions in the first embodiment.

In order to perform the above-mentioned processing, the data set creating part 82 allocates training data sets to the plurality of learning regions determined based on the ranges of the plurality of input parameters. FIG. 6 is a view schematically showing the plurality of learning regions in the first embodiment. In this example, as input parameters of the neural network model, two parameters (input parameter A and input parameter B) are used.

The input parameter A has a predetermined range, and the predetermined range is divided into a plurality of regions. Similarly, the input parameter B has a predetermined range, and the predetermined range is divided into a plurality of regions. In this example, in the input parameter A and input parameter B, the divided pluralities of regions have the same widths.

The space defined by the input parameter A and input parameter B (in the example of FIG. 6, the two-dimensional space) is divided into a plurality of learning regions. Each learning region is defined by one range of the input parameter A and one range of the input parameter B. Learning region nos. (i=1 to "n") are assigned to the learning regions. Note that, the space defined by a plurality of input parameters and the dimensions of the learning regions become equal to the number of the input parameters. Further, the number of the learning regions becomes a value multiplied by the number of all regions of the plurality of input parameters.

The learning part 83 performs learning of the neural network model for each learning region. The learning planning part 81 allocates the plurality of learning regions to stopping periods so that learning of the neural network model is not interrupted in the stopping periods. In other words, the learning planning part 81 allocates the plurality of learning regions to the stopping periods so that learning of the neural network model at each learning region is completed in each stopping period. By doing this, it is possible to complete learning of the neural network model in each learning region within successive stopping periods and in turn possible to raise the frequency of updating of the neural network model.

In the example of FIG. 5, the first learning region (i=1) is allocated to the first stopping period (p=1), the second learning region (i=2) is allocated to the second stopping period (p=2), the third learning region (i=3) is allocated to the third stopping period (p=3), the fourth learning region (i=4) and the fifth learning region (i=5) are allocated to the fourth stopping period (p=4), the sixth learning region (i=1) to the 12th learning region (i=12) are allocated to the fifth stopping period (p=5), the 13th learning region (i=13) and the 14th learning region (i=14) are allocated to the sixth stopping period (p=6), and the 15th learning region (i=15) and 16th learning region (i=16) are allocated to the seventh stopping period (p=7).

The processing part 85 uses the neural network model to calculate an output parameter. Specifically, the processing part 85 inputs the input parameters to the neural network model to thereby make the neural network model output an output parameter. By doing this, it is possible to predict the output parameter corresponding to the input parameters without using a sensor etc., to detect the measured value of the output parameter.

The control part 86 controls the vehicle based on the value of the output parameter calculated by the processing part 85. In the present embodiment, the control part 86 controls the internal combustion engine 1 based on the value of the output parameter calculated by the processing part 85. For example, if the output parameter is the concentration of NOx in the exhaust gas, when the predicted value of the concentration of NOx calculated by the processing part 85 is higher than the target concentration, the control part 86 increases the opening degree of the EGR control value 15 so that the concentration of NOx falls.

Below, referring to the flow charts of FIGS. 7 to 10, the control for performing learning of the neural network model in the vehicle will be explained in detail.

<Processing for Creating Data Sets>

Figure 7:
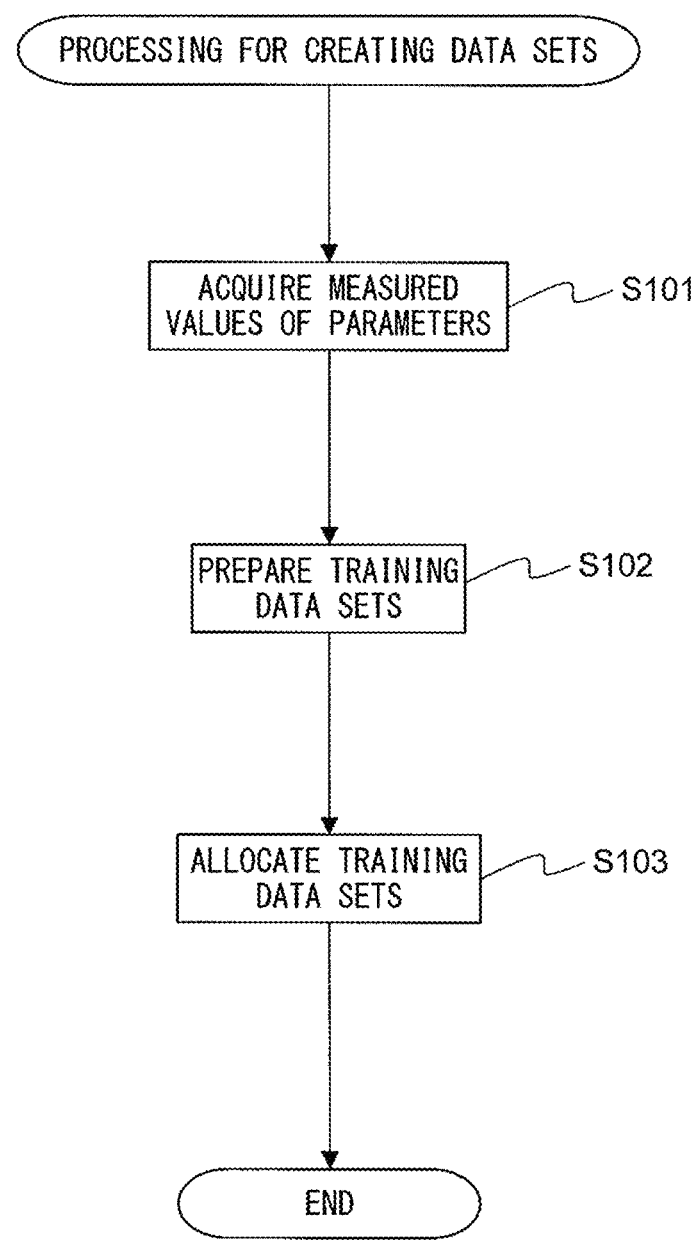
FIG. 7 is a flow chart showing a control routine of processing for creating data sets in the first embodiment of the present invention.

FIG. 7 is a flow chart showing a control routine of processing for creating data sets in the first embodiment of the present invention. The present control routine is repeatedly performed by the ECU 60 at predetermined time intervals.

First, at step S101, the data set creating part 82 acquires measured values of the input parameters and measured values of an output parameter corresponding to these measured values. The measured values of the input parameters and the output parameter are values detected by sensors etc, values calculated based on command values output from the ECU 60 to an actuator 91, etc.

Next, at step S102, the data set creating part 82 combines the measured values of the input parameters and the measured values of the output parameter to thereby create training data sets.

Next, at step S103, the data set creating part 82 allocates the training data sets to the learning regions. At this time, the training data sets are allocated to the learning regions so that the measured values of the input parameters of the training data sets are included in the ranges of input parameters defining the learning regions. The training data sets are stored together with the corresponding learning region nos. "i" of the learning regions in the memory 62 of the ECU 60. The training data sets stored in the memory 62 are erased in order from the oldest data first whereby a predetermined number of the latest training data sets are stored in the memory 62. Note that, the training data sets may be stored in another storage device provided at the vehicle. After step S103, the present control routine ends.

<Processing for Predicting Stopping Periods>

Figure 8:
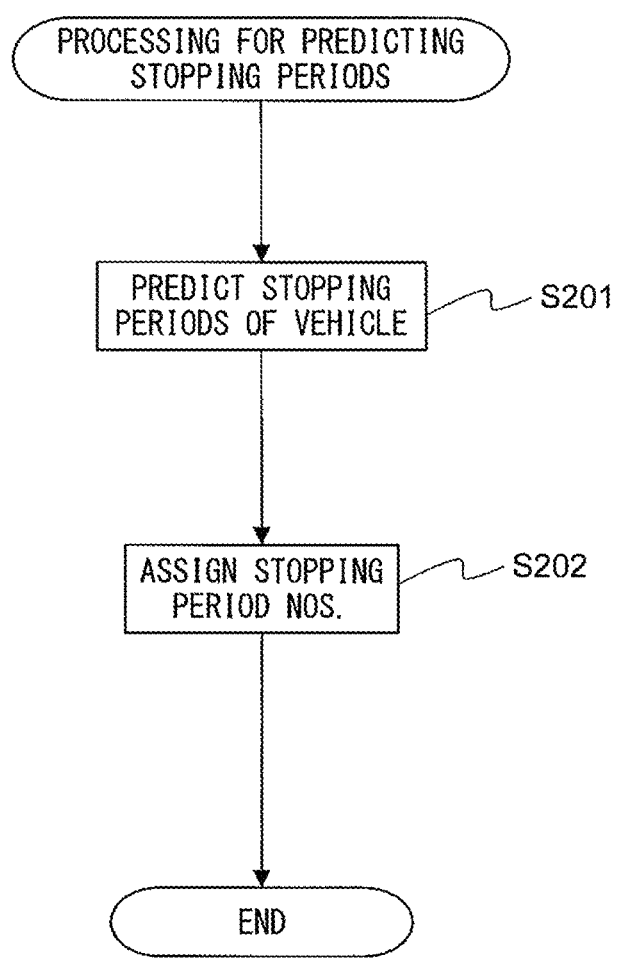
FIG. 8 is a flow chart showing a control routine of processing for predicting stopping periods in the first embodiment of the present invention.

FIG. 8 is a flow chart showing a control routine of processing for predicting stopping periods in the first embodiment of the present invention. The present control routine is repeatedly performed by the ECU 60 at predetermined time intervals.

First, at step S201, the stopping period predicting part 84 uses the prediction method explained above to predict the stopping periods. Next, at step S202, the stopping period predicting part 84, as shown in the example of FIG. 5, assigns the stopping periods the stopping period nos. "p". After step S202, the present control routine ends.

<Processing for Preparation of Learning Plan>

Figure 9:
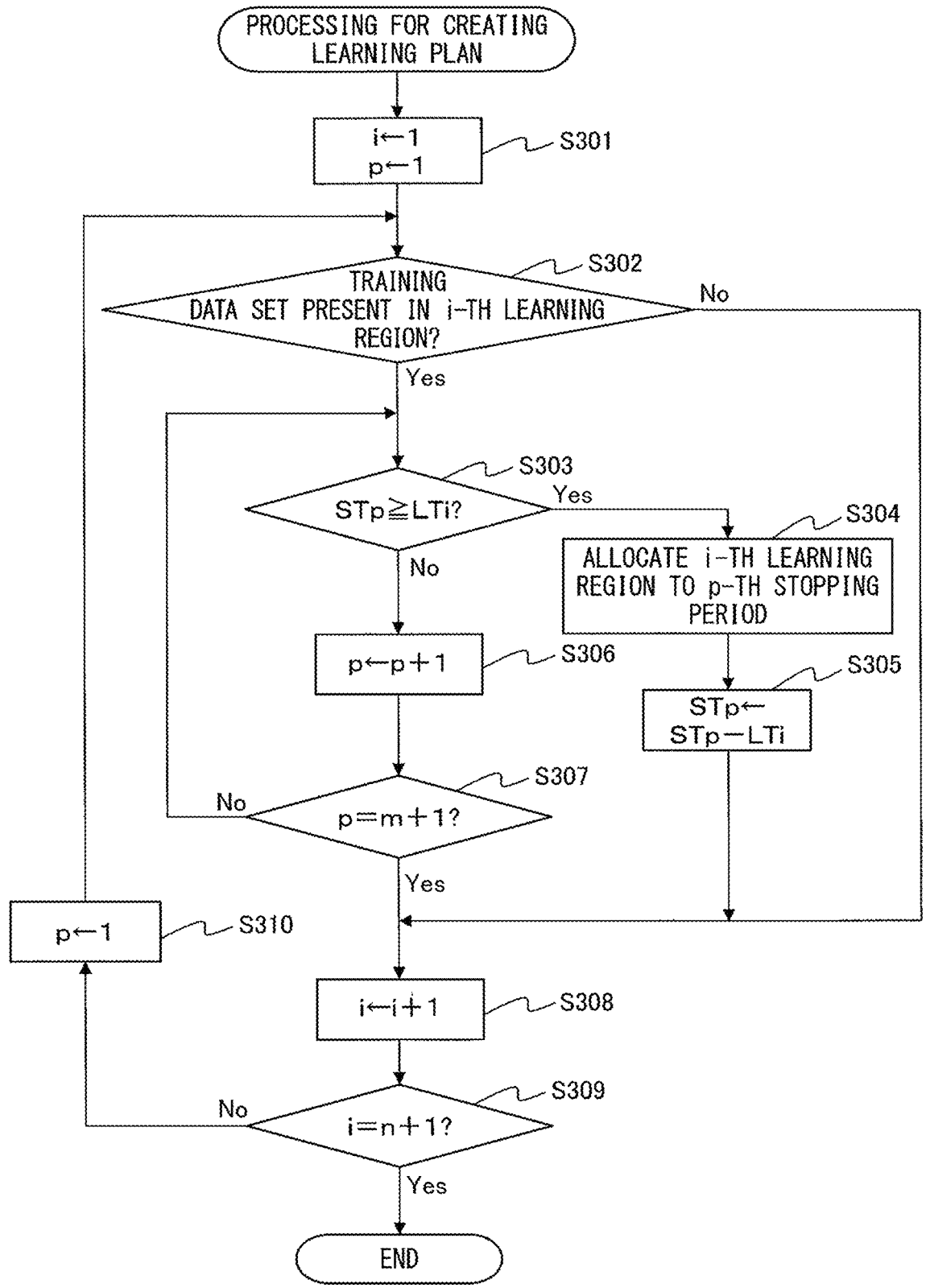
FIG. 9 is a flow chart showing a control routine of processing for creating a learning plan in the first embodiment of the present invention.

FIG. 9 is a flow chart showing a control routine of processing for creating a learning plan in the first embodiment of the present invention. The present control routine is repeatedly performed by the ECU 60 at predetermined time intervals.

First, at step S301, the learning planning part 81 sets the learning region no. "i" and stopping period no. "p" to "1".

Next, at step S302, the learning planning part 81 judges whether there is a training data set in the i-th learning region. The learning planning part 81 judges that there is a training data set in the i-th learning region if a training data set allocated to the i-th learning region is stored in the memory 62 of the ECU 60. If at step S302 it is judged that there is a training data set in the i-th learning region, the present control routine proceeds to step S303.

At step S303, the learning planning part 81 judges whether a stopping time STp of the p-th stopping period is equal to or greater than a learning time LTi of the i-th learning region. At this time, the learning planning part 81 calculates the learning time LTi of the i-th learning region based on the number of training data sets allocated to the i-th learning region. The greater the number of the training data sets, the longer the learning time LTi of the i-th learning region. On the other hand, for the stopping time STp of the p-th stopping period, the value predicted by the stopping period predicting part 84 is used.

If at step S303 it is judged that the stopping time STp of the p-th stopping period is equal to or greater than the learning time LTi of the i-th learning region, the present control routine proceeds to step S304. In this case, learning of the neural network model in the i-th learning region can be completed within the p-th stopping period. For this reason, at step S304, the learning planning part 81 allocates the i-th learning region to the p-th stopping period.

Next, at step S305, the learning planning part 81 updates the stopping time STp of the p-th stopping period to judge whether the next learning region can also be allocated to the p-th stopping period. Specifically, the learning planning part 81 sets the value of the stopping time STp of the p-th stopping period minus the learning time LTi of the i-th learning region as the new stopping time STp.

After step S305, the present control routine proceeds to step S308. Further, even if at step S302 it is judged that there is no training data set in the i-th learning region, the present control routine proceeds to step S308. At step S308, the learning planning part 81 adds 1 to the learning region no. "i". Next, at step S309, the learning planning part 81 judges whether the learning region no. "i" is n+1. As shown in FIG. 6, "n" is the total number of learning regions determined in advance.

If at step S309 it is judged that the learning region no. "i" is n+1, the present control routine ends. Note that, the training data sets in the learning regions and the results of prediction of the stopping periods are repeatedly updated by the control routine of FIGS. 7 and 8. For this reason, at the next control routine, the allocation of learning regions is resumed from the start.

On the other hand, if at step S309 it is judged that the learning region no. "i" is equal to or less than "n", the present control routine proceeds to step S310. At step S310, the learning planning part 81 sets the stopping period no. "p" to 1. After step S310, the present control routine returns to step S302 where whether the next learning region can be allocated is judged.

Further, if at step S303 it is judged that the stopping time STp of the p-stopping period is less than the learning time LTi of the i-th learning region, the present control routine proceeds to step S306. At step S306, the learning planning part 81 adds 1 to the stopping period no. so as to find another stopping period to which the i-th learning region can be allocated.

Next, at step S307, the learning planning part 81 judges whether the stopping period no. "p" is m+1. "m" is the total number of the predicted stopping periods. In the example of FIG. 5, it is 7. If at step S307 it is judged that the stopping period no. "p" is equal to or less than "m", the present control routine returns to step S303 where the possibility of allocation to the next stopping period is judged.

On the other hand, if at step S307 it is judged that the stopping period no. "p" is m+1, there is no stopping period to which the i-th learning region can be allocated, therefore at step S308, 1 is added to the learning region no. "i".

Next, at step S309, the learning planning part 81 judges whether the learning region no. "i" is n+1. If it is judged that the learning region no. "i" is n+1, the present control routine ends. On the other hand, if it is judged that the learning region no. "i" is equal to or less than "n", the present control routine proceeds to step S310. The subsequent processing is as explained above.

As explained above, in the present control routine, it is judged whether allocation is permissible in order from the learning region with the smallest learning region no. "i". As a result, a learning region having a relatively small learning region no. "i" is allocated to a stopping period with priority over a learning region having a relatively large learning region no. "i". That is, in the present embodiment, the learning region no. "i" shows the priority order of learning. The smaller the learning region no. "i", the higher the priority order of learning of that learning region. Therefore, it can be said that priority orders of learning are given to a plurality of learning regions. Note that, in the example of FIG. 6, priority orders are given in accordance with the order of arrangement of the learning regions, but, for example, priority orders may be given at random.

<Learning Processing>

Figure 10:
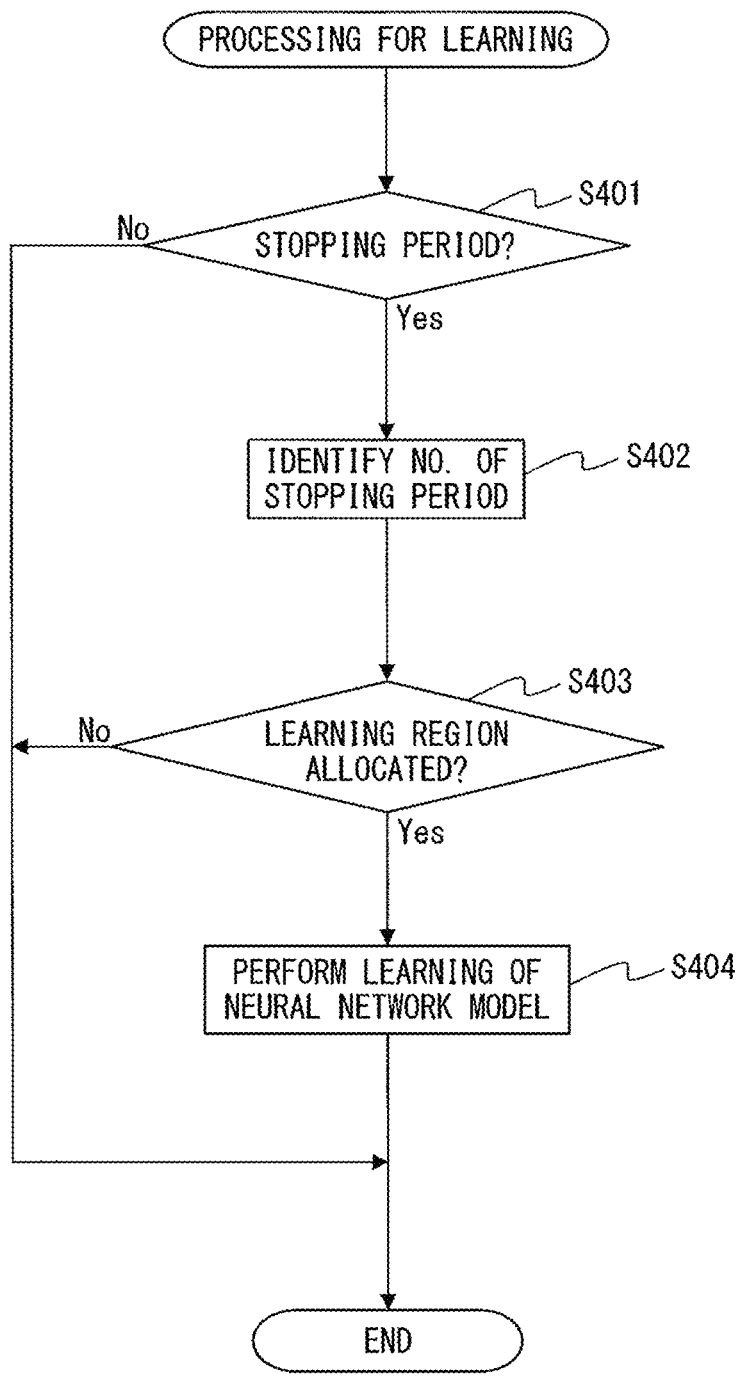
FIG. 10 is a flow chart showing a control routine of learning processing in the first embodiment of the present invention.

FIG. 10 is a flow chart showing a control routine of learning processing in the first embodiment of the present invention. The present control routine is repeatedly performed by the ECU 60.

First, at step S401, the learning part 83 judges whether the current time is a stopping period. For example, the learning part 83 judges that the current time is a stopping period if a state of the speed of the vehicle detected by the speed sensor 77 being zero has continued for equal to or greater than a predetermined time. If at step S401 it is judged that the current time is not a stopping period, that is, if it is judged that the current time is a driving period, the present control routine ends.

On the other hand, if at step S401 it is judged that the current time is a stopping period, the present control routine proceeds to step S402. At step S402, the learning part 83 compares the dates and times of the stopping periods predicted by the stopping period predicting part 84 with the current date and time so as to identify the stopping period no. "p" of the current stopping period.

Next, at step S402, the learning part 83 judges whether a learning region has been allocated to the stopping period of the stopping period no. "p" identified at step S402. If it is judged that no learning region has been allocated, the present control routine ends. On the other hand, it is judged that a learning region has been allocated, the present control routine proceeds to step S404.

At step S404, the learning part 83 performs learning of the neural network model in the allocated learning region. Specifically, the learning part 83 uses a training data set in the allocated learning region to repeatedly update the values of the weights "w" and the biases "b" in the neural network model by the above error backpropagation algorithm. After step S404, the present control routine ends.

Further, the learning part 83 updates the neural network model after the end of learning. Specifically, the learning part 83 changes the values of the weights "w" and biases "b" at the neural network model to final values updated by the learning. The processing part 85 uses the updated neural network model to calculate the output parameter.

Second Embodiment

The machine learning system according to the second embodiment is basically the same in configuration and control as the machine learning system according to the first embodiment except for the points explained below. For this reason, below, the second embodiment of the present invention will be explained focusing on parts different from the first embodiment.

In the first embodiment, the plurality of learning regions are defined by different combinations of ranges of the input parameters. On the other hand, in the second embodiment, the plurality of learning regions include a small learning region and at least one large learning region encompassing the small learning region. The small learning region and the at least one large learning regions are determined so that the small learning region become higher in data density than the large learning region. That is, the small learning region are defined by the ranges of input parameters with relatively high frequencies of appearance. The differential region of the large learning region and the small learning region is defined by the ranges of input parameters with relatively low frequencies of appearance.

The learning part 83 selectively allocates the small learning region and the at least one large learning regions to the stopping periods. In this case, in learning of the neural network model, the training data set in the small learning region is always used. For this reason, it is possible to promote learning of the neural network model for ranges of input parameters with a relatively high frequency of appearance. As a result, it is possible to improve the precision of calculation of the output parameter by the neural network model in a typical driving state of the vehicle.

Figure 11:
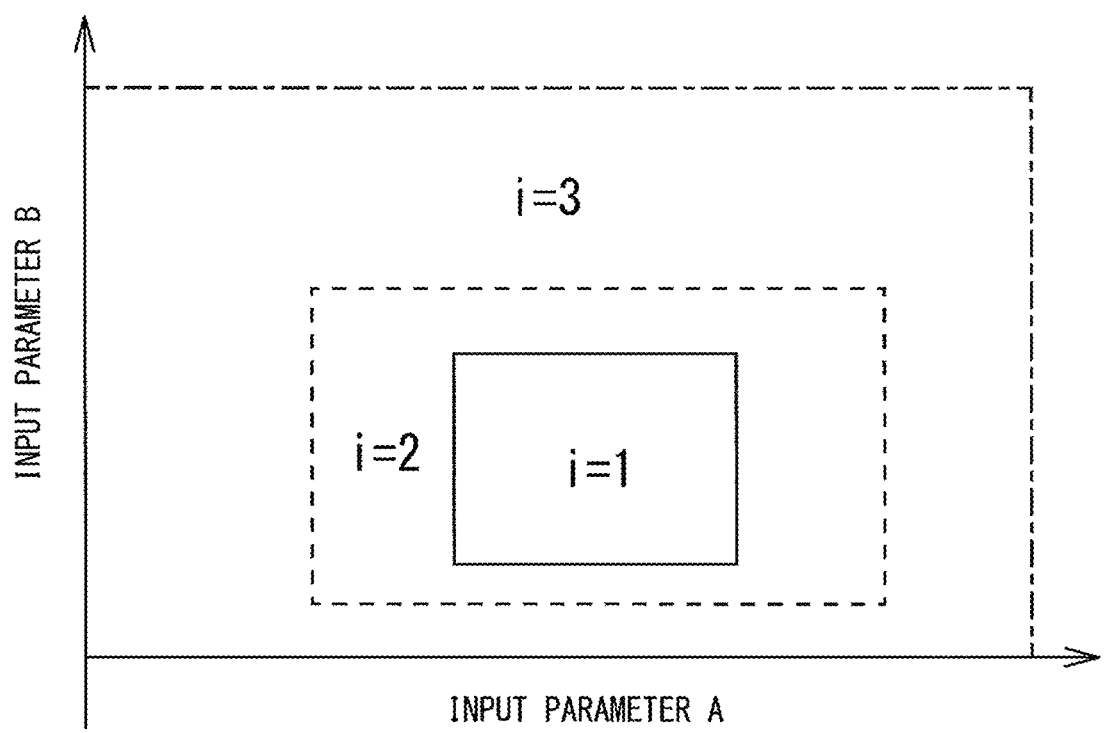
FIG. 11 is a view schematically showing a plurality of learning regions in a second embodiment.

FIG. 11 is a view schematically showing a plurality of learning regions in the second embodiment. In this example, the second learning region (i=2) encompasses the first learning region (i=1), while the third learning region (i=3) encompasses the first learning region (i=1) and second learning region (i=2). Therefore, the first learning region corresponds to a small learning region, while the second learning region and the third learning region correspond to large learning regions. Note that, the number of large learning regions may be a number other than 2.

For example, the small learning region and large learning region are determined in advance based on the prediction of the frequency of appearance of ranges of the plurality of input parameters so that the small learning region becomes higher in data density than the large learning region. Further, the small learning region and the large learning region may be determined based on the measured values of the input parameters acquired in a predetermined period after shipment of the vehicle so that the small learning region become higher in data density than the large learning region.

<Processing for Creating Learning Plans>

Figure 12:
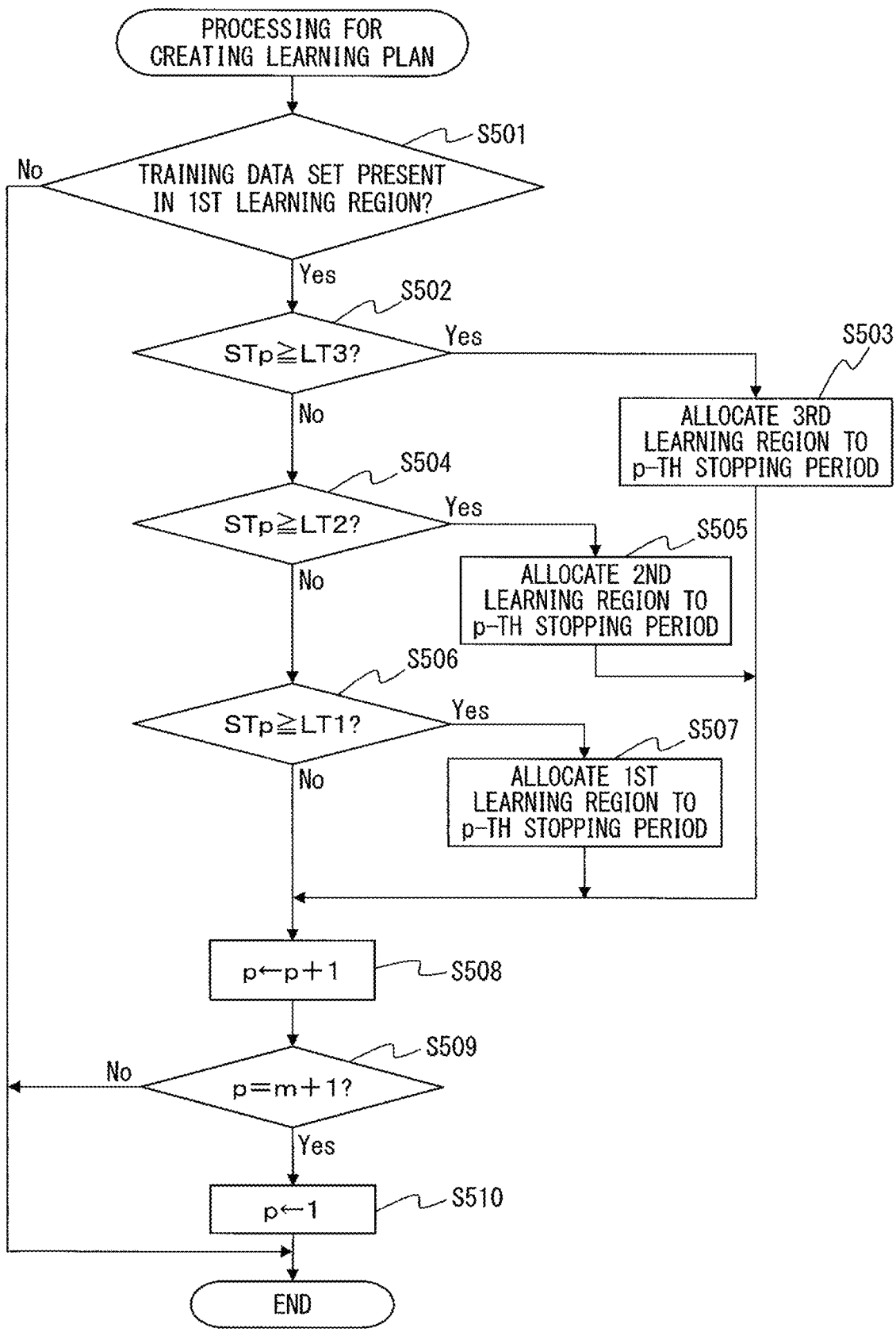
FIG. 12 is a flow chart showing a control routine of processing for creating a learning plan in the second embodiment of the present invention.

In the second embodiment, in addition to the control routines of FIGS. 7, 8, and 10, the control routine of FIG. 12 is performed instead of the control routine of FIG. 9. FIG. 12 is a flow chart showing the control routine of processing for creating a learning plan in the second embodiment of the present invention. The present control routine is repeatedly performed by the ECU 60 at predetermined time intervals.

First, at step S501, in the same way as step S301 of FIG. 9, the learning planning part 81 judges whether there is a training data set in the i-th learning region. The initial value of the learning region no. "i" is 1. If it is judged that there is no training data set in the i-th learning region, the present control routine ends. On the other hand, it if is judged that there is a training data set in the i-th learning region, the present control routine proceeds to step S502. Note that, the second learning region and the third learning region encompass the first learning region, therefore if there is a training data set in the first learning region, there is also a training data set in the second learning region and the third learning region.

At step S502, the learning planning part 81 judges whether the stopping time STp of the p-th stopping period is equal to or greater than the learning time LT3 of the third learning region. At this time, the learning planning part 81 calculates the learning time LT3 of the third learning region based on the number of training data sets allocated to the third learning region. The greater the number of training data sets, the longer the learning time LT3 of the third learning region. On the other hand, for the stopping time STp of the p-th stopping period, the value predicted by the stopping period predicting part 84 is used. The initial value of the stopping period no. "p" is 1.

If at step S502 it is judged that the stopping time STp of the p-th stopping period is equal to or greater than the learning time LT3 of the third learning region, the present control routine proceeds to step S503. At step S503, the learning planning part 81 allocates the third learning region to the p-th stopping period.

Next, at step S508, the learning planning part 81 adds 1 to the stopping period no. "p" and judges whether allocation to the next stopping period is permissible. Next, at step S509, the learning planning part 81 judges whether the stopping period no. "p" is m+1. "m" is the total number of predicted stopping periods.

If at step S509 it is judged that the stopping period no. "p" is equal to or less than "m", the present control routine ends. On the other hand, if at step S509 it is judged that the stopping period no. "p" is m+1, the present control routine proceeds to step S510. At step S510, the learning planning part 81 resets the stopping period no. "p" to "1" (initial value). After step S510, the present control routine ends.

Further, if at step S502 it is judged that the stopping time STp of the p-th stopping period is less than the learning time LT3 of the third learning region, the present control routine proceeds to step S504. At step S504, the learning planning part 81 judges whether the stopping time STp of the p-th stopping period is equal to or greater than the learning time LT2 of the second learning region. At this time, the learning planning part 81 calculates the learning time LT2 of the second learning region based on the number of training data sets allocated to the second learning region. The larger the number of training data sets, the longer the learning time LT2 of the second learning region. Note that, the third learning region encompasses the second learning region, therefore the learning time LT2 of the second learning region becomes equal to or less than the learning time LT3 of the third learning region.

If at step S504 it is judged that the stopping time STp of the p-th stopping period is equal to or greater than the learning time LT2 of the second learning region, the present control routine proceeds to step S505. At step S505, the learning planning part 81 allocates the second learning region to the p-th stopping period. Next, step S508 to step S510 are performed as explained above.

On the other hand, if at step S504 it is judged that the stopping time STp of the p-th stopping period is less than the learning time LT2 of the second learning region, the present control routine proceeds to step S506. At step S506, the learning planning part 81 judges whether the stopping time STp of the p-th stopping period is equal to or greater than the learning time LT1 of the first learning region. At this time, the learning planning part 81 calculates the learning time LT1 of the first learning region based on the number of training data sets allocated to the first learning region. The greater the number of training data sets, the longer the learning time LT1 of the first learning region. Note that, the third learning region and second learning region encompass the first learning region, therefore the learning time LT1 of the first learning region becomes equal to or less than the learning time LT3 of the third learning region and the learning time LT2 of the second learning region.

If at step S506 it is judged that the stopping time STp of the p-th stopping period is equal to or greater than the learning time LT1 of the first learning region, the present control routine proceeds to step S507. At step S507, the learning planning part 81 allocates the first learning region to the p-th stopping period. Next, step S508 to step S510 are performed as explained above.

On the other hand, if at step S506 it is judged that the stopping time STp of the p-th stopping period is less than the learning time LT1 of the first learning region, the present control routine proceeds to step S508. Step S508 to step S510 are performed as explained above.

Third Embodiment

The machine learning system according to the third embodiment is basically the same in configuration and control as the machine learning system according to the first embodiment except for the points explained below. For this reason, below, the third embodiment of the present invention will be explained focusing on parts different from the first embodiment.

In the third embodiment, in the same way as the first embodiment, priority orders of learning are imparted to the plurality of learning regions. On the other hand, in the third embodiment, unlike the first embodiment, the learning planning part 81 makes the priority order of learning of a learning region including a value of an input parameter with a relatively high frequency of appearance higher than the priority order of learning of a learning region including a value of an input parameter with a relatively low frequency of appearance. For this reason, it is possible to promote learning of the neural network model in the range of the input parameter with the relatively high frequency of appearance. As a result, in a typical driving state of a vehicle, it is possible to improve the precision of calculation of the output parameter by the neural network model.

In the third embodiment, the space defined by the plurality of input parameters is divided into a plurality of initial regions. The plurality of initial regions are allocated to three learning regions (first learning region, second learning region, and third learning region) based on the number of times of acquisition of measured values of the input parameters acquired at the vehicle. The initial regions are regions similar to the learning regions such as shown in FIG. 5. Note that, in the third embodiment, the number of learning regions may be any number of equal to or greater than two.

In the third embodiment, in the same way as the first embodiment, the control routines of FIGS. 7 to 10 are performed. At this time, in the third embodiment, at step S103 of FIG. 7, the data set creating part 82 allocates the training data sets to the learning regions and initial regions. In this case, the training data sets are stored together with the learning region nos. "i" of the corresponding learning regions and the initial region nos. "q" of the corresponding initial regions in the memory 62 of the ECU 60.

<Processing for Setting Learning Regions>

Figure 13:
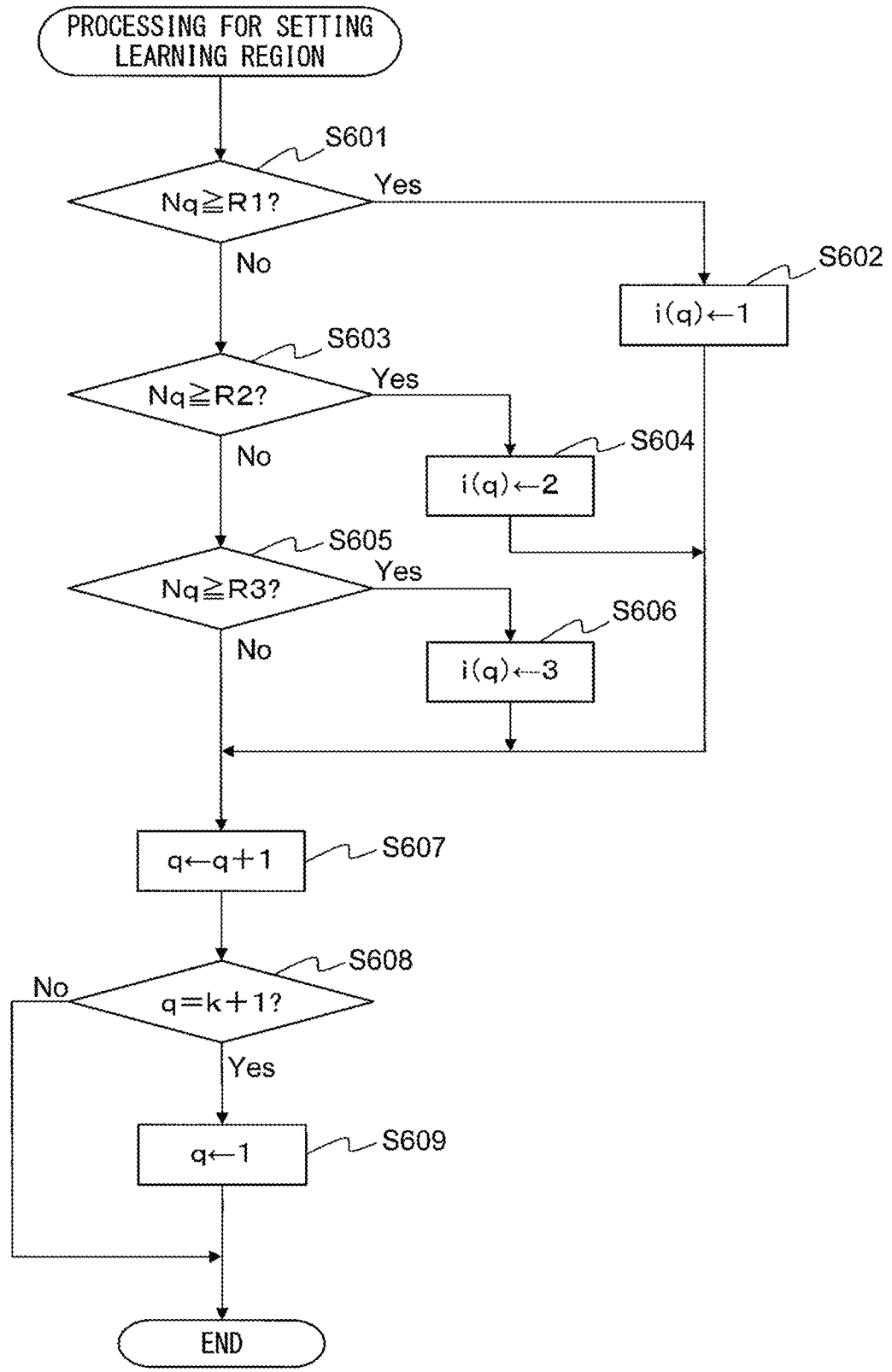
FIG. 13 is a flow chart showing a control routine of processing for setting learning regions in a third embodiment of the present invention.

Further, in the third embodiment, in addition to the control routines of FIGS. 7 to 10, the control routine of FIG. 13 is performed. FIG. 13 is a flow chart showing a control routine of processing for setting learning regions in the third embodiment of the present invention. The present control routine is repeatedly performed by the ECU 60 at predetermined time intervals.

First, at step S601, the learning planning part 81 judges whether the number Nq of the training data sets allocated to the q-th initial region is equal to or greater than a first reference value RE The first reference value R1 is determined in advance. The initial value of the initial region no. "q" is 1.

If at step S601 it is judged that the number Nq of the training data sets is equal to or greater than the first reference value R1, the present control routine proceeds to step S602.

At step S602, the learning planning part 81 sets the learning region no. "i" of the q-th initial region to "1".

Next, at step S607, the learning planning part 81 sets the learning region no. "i" of the next initial region by adding 1 to the initial region no. "q". Next, at step S608, the learning planning part 81 judges whether the initial region no. "q" is k+1. "k" is the total number of initial regions determined in advance.

If at step S608 it is judged that the initial region no. "q" is equal to or less than "k", the present control routine ends. On the other hand, if at step S608 it is judged that the initial region no. "q" is k+1, the present control routine proceeds to step S609. At step S609, the learning planning part 81 resets the initial region no. "q" to 1 (initial value). After step S609, the present control routine ends.

On the other hand, if at step S601 it is judged that the number Nq of the training data sets is less than the first reference value R1, the present control routine proceeds to step S603. At step S603, the learning planning part 81 judges whether the number Nq of the training data sets allocated to the q-th initial region is equal to or greater than a second reference value R2. The second reference value R2 is determined in advance and is set to a value smaller than the first reference value R1.

If at step S603 it is judged that the number Nq of the training data sets is equal to or greater than the second reference value R2, the present control routine proceeds to step S604. At step S604, the learning planning part 81 sets the learning region no. "i" of the q-th initial region to "2". In the control routine of FIG. 9, the first learning region is allocated to the stopping period with priority over the second learning region. For this reason, the second learning region is lower in priority order of learning than the first learning region. Next, step S607 to step S609 are performed as explained above.

On the other hand, if at step S603 it is judged that the number Nq of the training data sets is less than the second reference value R2, the present control routine proceeds to step S605. At step S605, the learning planning part 81 judges whether the number Nq of the training data sets allocated to the q-th initial region is equal to or greater than a third reference value R3. The third reference value R3 is determined in advance and is set to a value smaller than the first reference value R1 and second reference value R2.

If at step S605 it is judged that the number Nq of the training data sets is equal to or greater than the third reference value R3, the present control routine proceeds to step S606. At step S606, the learning planning part 81 sets the learning region no. "i" of the q-th initial region to "3. In the control routine of FIG. 9, the first learning regions and second learning regions are allocated to the stopping period with priority over the third learning region. For this reason, the third learning region is lower in priority order of learning than the first learning region and second learning region. Next, step S607 to step S609 are performed as explained above.

Fourth Embodiment

The machine learning system according to the fourth embodiment is basically the same in configuration and control as the machine learning system according to the first embodiment except for the points explained below. For this reason, below, the fourth embodiment of the present invention will be explained focusing on parts different from the first embodiment.

In the fourth embodiment, the learning part 83 performs learning of a plurality of neural network models. The plurality of neural network models respectively output different types of output parameters.

For example, the learning part 83 performs learning of six neural network models. For example, in the first neural network model, the input parameters include the engine speed, amount of fresh air, and ignition timing, while the output parameter is the concentration of hydrocarbons (HC) in the exhaust gas. Further, in the second neural network model, the input parameters include the engine speed, amount of fresh air, and amount of EGR gas, while the output parameter is the concentration of NOx in the exhaust gas. Further, in the third neural network model, the input parameters include the engine speed, amount of fresh air, amount of EGR, and ignition timing, while the output parameter is the concentration of carbon monoxide (CO) in the exhaust gas. Further, in the fourth neural network model, the input parameters include the engine speed, amount of fresh air, and amounts of fuel injection, while the output parameter is the fuel efficiency of the vehicle. Further, in the fifth neural network model, the input parameters include the engine speed, amount of fresh air, and ignition timings, while the output parameter is the output torque of the internal combustion engine 1. Further, in the sixth neural network model, the input parameters include the engine speed, amount of fresh air, and amounts of fuel injection, while the output parameter is the concentration of carbon dioxide ($CO_2$) in the exhaust gas.

In this case, the measured values of the input parameters and the output parameters can be acquired in the following way. The engine speed is calculated based on the output of the crank angle sensor 74. The amount of fresh air is detected by the air flow meter 71. The ignition timings are calculated based on command values from the ECU 60 to the spark plugs. The amount of EGR gas is calculated based on the opening degree of the EGR control valve 15 etc. The amounts of fuel injection are calculated based on command values from the ECU 60 to the fuel injectors. The concentration of NOx in the exhaust gas is detected by the NOx sensor 73. The fuel efficiency of the vehicle is, for example, calculated by dividing the driven distance by the amount of used fuel. The concentration of HC, the concentration of CO, and the concentration of $CO_2$ in the exhaust gas are, for example, calculated based on the output of the air-fuel ratio sensor 72. Note that, these concentrations may be directly detected by exhaust sensors detecting concentrations of predetermined constituents.

In the fourth embodiment, in each of the plurality of neural network models, the space defined by the plurality of input parameters is divided into a plurality of learning regions. The learning regions of different neural network models are assigned different learning region nos. Further, in the same way as the first embodiment, the plurality of learning regions are assigned priority orders of learning.

If a plurality of neural network models outputting different output parameters are learned, the priority orders of the learning of the neural network models change according to the information of the road on which the vehicle is being driven etc. For this reason, the learning planning part 81 changes the priority orders of learning imparted to the plurality of learning regions based on the information of the road on which the vehicle is being driven. Due to this, it is possible to make the neural network models conform to the driving state of the vehicle.

For example, if the road on which the vehicle is being driven is an uphill slope, the internal combustion engine 1 must be used to generate the power required for the uphill slope. For this reason, in order to raise the precision of calculation of the output torque of the internal combustion engine 1, the priority order of learning of the neural network model outputting the output torque of the internal combustion engine 1 (fifth neural network model) becomes the highest.

Therefore, if the road on which the vehicle is being driven is an uphill slope, compared to if the road on which the vehicle is being driven is not an uphill slope, the learning planning part 81 raises the priority order of the learning region corresponding to the fifth neural network model.

<Processing for Changing Learning Region Nos.>

In the fourth embodiment, in addition to the control routine of FIGS. 7 to 10, the control routine of FIG. 14 is performed. FIG. 14 is a flow chart showing the control routine of processing for changing the learning region nos. in the fourth embodiment of the present invention. The present control routine is repeatedly performed by the ECU 60 at predetermined time intervals.

First, at step S801, the learning planning part 81 judges whether the road on which the vehicle is being driven is an uphill slope. For example, the learning planning part 81 judges whether the road on which the vehicle is being driven is an uphill slope based on the current position of the vehicle detected by the GPS receiver 92 and the map information stored in the map database 93.

If at step S801 it is judged that the road on which the vehicle is being driven is not an uphill slope, the present control routine proceeds to step S803. A step S803, the learning planning part 81 initializes the learning region nos. "i". That is, the learning region nos. "i" of all of the learning regions are set to predetermined initial values. After step S803, the present control routine ends.

On the other hand, if at step S801 it is judged that the road is an uphill slope, the present control routine proceeds to step S802. At step S802, the learning planning part 81 changes the learning region nos. "i" from the initial values. Specifically, the learning planning part 81 decreases the learning region nos. "i" of the learning regions corresponding to the fifth neural network model outputting the output torque of the internal combustion engine 1. For example, the learning region nos. "i" of the corresponding learning regions are made smaller in the order of the sixth neural network model, fourth neural network model, third neural network model, first neural network model, second neural network model, and fifth neural network model. After step S802, the present control routine ends.

Note that, if the vehicle is being driven on a highway, the frequency of appearance of a predetermined range (for example, 80 km/h to 120 km/h) of speed of the vehicle becomes higher. For this reason, if the road on which the vehicle is being driven is a highway, compared to if the road on which the vehicle is being driven is not a highway, the learning planning part 81 may raise the priority orders of the learning regions including the predetermined range of speed of the vehicle. In this case, the learning part 83 performs learning of the neural network model including the speed of the vehicle as an input parameter. Further, in this case, the learning part 83 may perform learning for only one neural network model.

Fifth Embodiment

The machine learning system according to the fifth embodiment is basically the same in configuration and control as the machine learning system according to the fourth embodiment except for the points explained below. For this reason, below, the fifth embodiment of the present invention will be explained focusing on parts different from the fourth embodiment.

Like in the fourth embodiment, the target of the neural network model is the internal combustion engine 1. If a plurality of neural network models outputting different output parameters are learned, the priority orders of learning of the neural network models change in accordance with the warmup state of the internal combustion engine 1. For this reason, the learning planning part 81 changes the priority orders of learning imparted to the plurality of learning regions based on the warmup state of the internal combustion engine 1. By doing this, it is possible to make the neural network model conform to the state of the internal combustion engine 1.

If the internal combustion engine 1 has not finished warming up, the purification performance of the catalyst 29 falls. For this reason, in order to keep the exhaust emissions from deteriorating, it is necessary to improve the precision of calculation of the concentrations of harmful substances in the exhaust gas (NOx, HC, and CO). On the other hand, if the internal combustion engine 1 has finished warming up, priority is given to the fuel efficiency of the vehicle. For this reason, if the internal combustion engine 1 has not finished warming up, compared to if the internal combustion engine 1 has finished warming up, the learning planning part 81 raises the priority orders of the learning regions corresponding to the neural network models outputting concentrations of harmful substances in the exhaust gas (first neural network model to third neural network model) and lowers the priority orders of the learning regions corresponding to the neural network model outputting the fuel efficiency of the vehicle (fourth neural network model).

<Processing for Changing Learning Region Nos.>

In the fifth embodiment, in addition to the control routines of FIGS. 7 to 10, the control routine of FIG. 15 is performed. FIG. 15 is a flow chart showing the control routine of processing for changing learning region nos. in a fifth embodiment of the present invention. The present control routine is repeatedly performed by the ECU 60 at predetermined time intervals.

First, at step S901, the learning planning part 81 acquires the warmup state of the internal combustion engine 1. Specifically, the learning planning part 81 judges whether the internal combustion engine 1 has finished warming up. This judgment is, for example, performed based on an output of a water temperature sensor provided in the internal combustion engine 1, an output of an exhaust temperature sensor provided in an exhaust passage of the internal combustion engine 1, a cumulative amount of fresh air calculated based on an output of the air flow meter 71, etc.

Next, at step S902, the learning planning part 81 changes the learning region nos. "i". Specifically, if the internal combustion engine 1 has not finished warming up, compared to if the internal combustion engine 1 has finished warming up, the learning planning part 81 makes the learning region nos. "i" of the learning regions corresponding to the first neural network model to third neural network model outputting concentrations of harmful substances in exhaust gas smaller and makes the learning region nos. "i" of the learning regions corresponding to the fourth neural network model outputting the fuel efficiency of the vehicle larger.

For example, if the internal combustion engine 1 has not finished warming up, the learning region nos. "i" of the corresponding learning regions are made smaller in the order of the sixth neural network model, fifth neural network model, fourth neural network model, third neural network model, second neural network model, and first neural network model. On the other hand, if the internal combustion engine 1 has finished warming up, the learning region nos. "i" of the corresponding learning regions are made smaller in the order of the sixth neural network model, fifth neural network model, third neural network model, first neural network model, second neural network model, and fourth neural network model. After step S902, the present control routine is ended.

Other Embodiments

Above, preferred embodiments according to the present invention were explained, but the present invention is not limited to these embodiments and can be corrected and changed in various ways within the language of the claims.

For example, so long as relating to a vehicle, the neural network model may cover something other than the above internal combustion engine 1 as well. For example, the target of the neural network model may be the vehicle itself, a compression ignition type internal combustion engine (diesel engine), transmission, etc.

Further, the vehicle mounting the machine learning system may be a hybrid vehicle (HV) provided with a motor as a drive source, a plug-in hybrid vehicle (PHV), or an electric vehicle (EV). In this case, the target of the neural network model may be an electric motor, a battery supplying electric power to the electric motor, etc.

Further, as input parameters and output parameters of the neural network model, various parameters can be utilized in accordance with the target of the neural network model. Sensors for detecting the measured values of the input parameters or output parameters are selected in accordance with the types of the input parameters and output parameters.

Further, the above-mentioned embodiments can be freely combined to be worked. For example, the fourth embodiment can be combined with the fifth embodiment. In this case, for example, in the control routine of FIG. 14, instead of step S803, step S901 and step S902 of FIG. 15 are performed.

REFERENCE SIGNS LIST 1. internal combustion engine
60. electronic control unit (ECU)
81. learning planning part
82. data set creating part
83. learning part
84. stopping period predicting part

The invention claimed is:

1. A machine learning system provided in a vehicle, comprising:
a learning planning part configured to create a learning plan of a neural network model outputting at least one output parameter from a plurality of input parameters,
a data set creating part configured to acquire measured values of the plurality of input parameters and a measured value of the at least one output parameter corresponding to the measured values to create training data sets,
a learning part configured to perform learning of the neural network model using the training data sets when the vehicle is stopped based on the learning plan, and
a stopping period predicting part configured to predict stopping periods of the vehicle, wherein
the data set creating part is configured to allocate the training data sets to a plurality of learning regions determined based on respective ranges of the plurality of input parameters,
the learning part is configured to perform learning of the neural network model for each learning region, and
the learning planning part is configured to allocate each of the plurality of learning regions to a corresponding stopping period of the stopping periods, and
a control part configured to control a drive system of the vehicle based on the neural network model.

2. The machine learning system according to claim 1, wherein
the plurality of learning regions includes a small learning region and at least one large learning region encompassing the small learning region, the small learning region and the at least one large learning region being determined so that the small learning region become higher in data density than the large learning region, and
the learning planning part is configured to selectively allocate the small learning region and the at least one large learning region to the stopping periods.

3. The machine learning system according to claim 1, wherein priority orders of learning are given to the plurality of learning regions.

4. The machine learning system according to claim 3, wherein the learning planning part is configured to make the priority orders of learning of learning regions including values of the input parameters with relatively high frequencies of appearance higher than the priority orders of learning of learning regions including values of the input parameters with relatively low frequencies of appearance.

5. The machine learning system according to claim 3, wherein the learning planning part is configured to change the priority orders of learning in accordance with information on a road over which the vehicle is being driven or a warmup state of an internal combustion engine provided in the vehicle.

6. A electronic control unit provided in a vehicle, configured to:
create a learning plan of a neural network model outputting at least one output parameter from a plurality of input parameters,
acquire measured values of the plurality of input parameters and a measured value of the at least one output parameter corresponding to the measured values to create training data sets,
perform learning of the neural network model using the training data sets when the vehicle is stopped based on the learning plan,
predict stopping periods of the vehicle,
allocate the training data sets to a plurality of learning regions determined based on respective ranges of the plurality of input parameters,
perform learning of the neural network model for each learning region,
allocate each of the plurality of learning regions to a corresponding stopping period of the stopping periods, and
control a drive system of the vehicle based on the neural network model.

* * * * *